United States Patent
Gong et al.

(10) Patent No.: US 9,923,649 B2
(45) Date of Patent: Mar. 20, 2018

(54) INTERFERENCE MEASUREMENT METHOD, NETWORK-SIDE DEVICE AND TERMINAL DEVICE FOR IMPROVING THE INTERFERENCE MEASUREMENT EFFECT AND THUS THE DEMODULATION PERFORMANCE OF DATA AND CONTROL CHANNELS

(71) Applicant: ZTE CORPORATION, Shenzhen, Guangdong (CN)

(72) Inventors: Yuhong Gong, Shenzhen (CN); Yunfeng Sun, Shenzhen (CN); Junfeng Zhang, Shenzhen (CN)

(73) Assignee: ZTE CORPORATION (CN)

( * ) Notice: Subject to any disclaimer, the term of this patent is extended or adjusted under 35 U.S.C. 154(b) by 200 days.

(21) Appl. No.: 14/782,193

(22) PCT Filed: Mar. 13, 2014

(86) PCT No.: PCT/CN2014/000264
§ 371 (c)(1),
(2) Date: Oct. 2, 2015

(87) PCT Pub. No.: WO2014/166297
PCT Pub. Date: Oct. 16, 2014

(65) Prior Publication Data
US 2016/0036542 A1    Feb. 4, 2016

(30) Foreign Application Priority Data
Apr. 8, 2013   (CN) .......................... 2013 1 0119746

(51) Int. Cl.
*H04B 17/345* (2015.01)
*H04W 24/10* (2009.01)
(Continued)

(52) U.S. Cl.
CPC ............ *H04B 17/345* (2015.01); *H04L 5/00* (2013.01); *H04W 24/10* (2013.01); *H04B 7/024* (2013.01); *H04B 7/0456* (2013.01)

(58) Field of Classification Search
CPC .... H04B 17/345; H04B 7/0456; H04B 7/024; H04L 5/00; H04W 24/10
See application file for complete search history.

(56) References Cited

U.S. PATENT DOCUMENTS

| | | | |
|---|---|---|---|
| 9,369,253 B2 * | 6/2016 | Pourahmadi | |
| 2013/0089040 A1 * | 4/2013 | Tabet | H04L 5/0073 370/329 |

(Continued)

FOREIGN PATENT DOCUMENTS

| | | |
|---|---|---|
| CN | 102149124 A | 8/2011 |
| CN | 102300244 A | 12/2011 |

(Continued)

*Primary Examiner* — Tejis Daya
(74) *Attorney, Agent, or Firm* — Plumsea Law Group, LLC

(57) ABSTRACT

An interference measurement method, a network side device and a terminal device are disclosed. The interference measurement method includes: a network side sending interference measurement indication information to a terminal, and indicating the terminal to perform interference measurement, wherein the interference measurement indication information is used for indicating one or more kinds of the following information to the terminal: interference measurement modes used for performing interference measurement; and parameter configuration information used for interference measurement.

18 Claims, 7 Drawing Sheets

(51) Int. Cl.
*H04L 5/00* (2006.01)
*H04B 7/024* (2017.01)
*H04B 7/0456* (2017.01)

(56) References Cited

U.S. PATENT DOCUMENTS

| | | | | |
|---|---|---|---|---|
| 2013/0286867 A1* | 10/2013 | Davydov | .............. | H04W 24/06 370/252 |
| 2014/0086082 A1* | 3/2014 | Kim | ..................... | H04B 17/345 370/252 |
| 2014/0126404 A1* | 5/2014 | Kim | ......................... | H04L 1/00 370/252 |
| 2014/0198683 A1* | 7/2014 | Ihm | ..................... | H04B 7/0417 370/252 |
| 2014/0233466 A1* | 8/2014 | Pourahmadi | ........ | H04L 27/2613 370/329 |
| 2014/0241200 A1* | 8/2014 | Chun | .................... | H04L 5/0048 370/252 |
| 2014/0301336 A1* | 10/2014 | Kim | ........................ | H04L 5/001 370/329 |
| 2015/0124717 A1* | 5/2015 | Li | ........................ | H04W 24/10 370/329 |
| 2015/0131604 A1* | 5/2015 | Hammarwall | ........ | H04L 1/0026 370/330 |

FOREIGN PATENT DOCUMENTS

| | | |
|---|---|---|
| CN | 102547872 A | 7/2012 |
| WO | 2012142901 A1 | 10/2012 |
| WO | 2012155520 A1 | 11/2012 |
| WO | 2013107259 A1 | 7/2013 |

\* cited by examiner

INTERFERENCE MEASUREMENT METHOD, NETWORK-SIDE DEVICE AND TERMINAL DEVICE FOR IMPROVING THE INTERFERENCE MEASUREMENT EFFECT AND THUS THE DEMODULATION PERFORMANCE OF DATA AND CONTROL CHANNELS

TECHNICAL FIELD

The present document relates to the wireless communication technology, and particularly, to an interference measurement method, a network side device and a terminal device.

BACKGROUND OF THE RELATED ART

In order to obtain a higher spectrum efficiency promotion, the density of cell deployment is getting higher, the user interference in the same cell and inter-cell co-channel interference increasingly become the major factors limiting the network capacity, as shown in FIG. 1 and FIG. 2.

In the current research, it is mainly based on the interference avoidance and coordination technology of the network side, and the basic idea is to implement the interference avoidance at the sending side by means of precoding and coordinated scheduling of the network side. However, the interference coordination based on the sending party depends on the accuracy of Channel State Information in feedback to a great extent. According to the related research data, it indicates that the interference also can be well compressed by using an advanced receiving method, while compared to the interference coordination of the sending party, the pressure of channel information feedback can be relieved based on an enhancement of the terminal. Therefore, how to better compress the interference by optimizing the terminal receiving is an important direction to improve the spectrum efficiency effectively.

In an LTE system, a Common Reference Signal (CRS) is used to perform pilot measurement and demodulation, that is, all users use the CRS to perform channel estimation. When a precoding processing mode based on the CRS is adopted, a transmitting end is required to additionally inform a receiving end of specific precoding matrix (also can be called as precoding weight) information used during the data transmission, and the pilot overhead is large. Moreover, in Multi-user Multi-input Multi-output (MU-MIMO), since a plurality of terminals use the same CRS, the pilot orthogonality cannot be implemented, thus the interference cannot be estimated.

In an Advanced Long Term Evolution (LTE-A) system, in order to reduce the pilot overhead and improve the accuracy of channel estimation, the pilot measurement function and data demodulation function are separated, and two types of reference signals are respectively defined: a Demodulation Reference Signal (DMRS) and a Channel State Information Referenced Signal (CSI-RS). Wherein, the CSI-RS is mainly used for channel measurement to obtain Channel Quality Information (CQI) and perform feedback, so that a base station side can complete user scheduling and complete adaptive allocation of the Modulation and Coding Scheme (MCS) through the information, and precoding information is not carried in the CSI-RS transmission; and the DMRS is mainly used for channel estimation of a Physical Downlink Shared Channel (PDSCH) and enhanced Physical Downlink Control Channel (ePDCCH) to complete demodulation of the data/control channels, and precoding information of the corresponding PDSCH/ePDCCH is carried in the DMRS transmission. However, only the channel estimation performance of the target user is improved by these, and the interference measurement effect is not improved. And both the CQI measurement performance and the demodulation performance of the data/control channels are not only related to the channel estimation performance, but the interference measurement performance is also crucial.

In the LTE-A Rel-11 stage, even though a Channel State Information Interference Measurement (CSI-IM) signal is specially introduced in order to improve the CQI measurement performance, since the signal is not sent in each subframe, the actual interference of data transmission timeslots (subframes) cannot be reflected well, and interference information of each layer cannot be measured, thus it cannot be well used for Interference Cancellation/Interference Suppression (IC/IS) of the receiving side well in demodulation of the data/control channels. Therefore, how to improve the interference measurement effect and thus the demodulation performance of the data/control channels needs to be further studied.

SUMMARY

The embodiments of the present document provide an interference measurement method, a network side device and a terminal device, which can improve the interference measurement effect on data channels and control channels.

An interference measurement method according to the embodiment of the present document comprises:

a network side sending interference measurement indication information to a terminal to indicate the terminal to perform interference measurement, wherein the interference measurement indication information is used for indicating one or more kinds of the following information to the terminal:

interference measurement modes used for performing interference measurement; and parameter configuration information used for interference measurement.

Alternatively, the interference measurement modes comprise one or more kinds of the following modes:

performing interference measurement through orthogonal demodulation reference signal DMRS ports, wherein the mode is to perform interference measurement through DMRS ports orthogonal to DMRS ports used for transmitting data of the terminal;

performing interference measurement through pseudo-orthogonal DMRS ports, wherein the mode is to perform interference measurement through DMRS ports pseudo-orthogonal to DMRS ports used for transmitting data of the terminal;

performing interference measurement through specified resource element REs, wherein the mode is, by transmitting a zero-power signal to the terminal on the specified REs, the terminal performing interference measurement through a received signal on the specified REs; and "power subtraction" interference measurement, wherein the mode is to perform interference measurement by subtracting useful signals from a total received signal or subtracting received powers of the useful signals from a total received signal power.

Alternatively, the parameter configuration information used for interference measurement comprises one or more kinds of the following information:

DMRS initialization parameters used for interference measurement; and

DMRS ports used for interference measurement.

Alternatively, the DMRS initialization parameters used for interference measurement comprise: at least one of a scramble code identity related to a DMRS sequence used for interference measurement, a cell identity related to a DMRS sequence used for interference measurement and a subframe/time slot/physical resource block PRB in which a DMRS used for interference measurement is located; and the DMRS ports used for interference measurement comprise at least one of DMRS ports 7~14, or comprise at least one of DMRS ports 107~110.

Alternatively, when the parameter configuration information used for interference measurement simultaneously comprises the DMRS initialization parameters used for interference measurement and the DMRS ports used for interference measurement, the network side configures the DMRS initialization parameters for each DMRS port independently.

Alternatively, performing interference measurement through the DMRS ports orthogonal to the DMRS ports used for transmitting the data of the terminal comprises:

the DMRS ports used for interference measurement and the DMRS ports used for transmitting the data of the terminal satisfying an orthogonal relationship, and the terminal having known related parameter information of interference signal transmission on the DMRS ports used for interference measurement.

Alternatively, performing interference measurement through the orthogonal DMRS ports comprises one or more kinds of the following modes:

time-frequency resource locations of the DMRS ports used for interference measurement and time-frequency resource locations of the DMRS ports used for transmitting the data of the terminal are overlapped, and the terminal performs interference measurement by using initialization parameters identical with and orthogonal masks different from those of the DMRS ports used for transmitting the data of the terminal; and time-frequency resource locations of the DMRS ports used for interference measurement and time-frequency resource locations of the DMRS ports used for transmitting the data of the terminal are different, and the terminal transmits a zero-power signal on the DMRS ports used for interference measurement, the terminal performs interference measurement through the DMRS initialization parameters and orthogonal masks of the DMRS ports used for interference measurement.

Alternatively, performing interference measurement through the DMRS ports pseudo-orthogonal to the DMRS ports used for transmitting the data of the terminal comprises:

the DMRS ports used for interference measurement and the DMRS ports used for transmitting the data of the terminal satisfying a pseudo-orthogonal relationship, and the terminal having known related parameter information of interference signal transmission on the DMRS ports used for interference measurement.

Alternatively, performing interference measurement through the pseudo-orthogonal DMRS ports comprises one or more kinds of the following modes:

time-frequency resource locations of the DMRS ports used for interference measurement and time-frequency resource locations of the DMRS ports used for transmitting the data of the terminal are overlapped, and the terminal performs interference measurement by using DMRS initialization parameters different from and orthogonal masks different from those of the DMRS ports used for transmitting the data of the terminal; and time-frequency resource locations of the DMRS ports used for interference measurement and time-frequency resource locations of the DMRS ports used for transmitting the data of the terminal are different, and the terminal transmits a non-zero-power signal on the DMRS ports used for interference measurement, the terminal performs interference measurement through the DMRS initialization parameters and orthogonal masks of the DMRS ports used for interference measurement.

Alternatively, performing interference measurement through the specified REs comprises one or more kinds of the following modes:

the specified REs are REs in locations where one or more DMRS ports, except DMRS ports used for transmitting data to the terminal, are located, the network side sends the zero-power signal to the terminal on the REs in locations where the one or more DMRS ports are located, and the terminal performs interference measurement through the received signal on the REs in locations where the DMRS ports are located; and the specified REs are part of REs in locations where the DMRS ports are located, the network side sends the zero-power signal to the terminal on the part of REs in locations where the DMRS ports are located, and the terminal performs interference measurement through the received signal on the part of REs in locations where the DMRS ports are located.

Alternatively, the network side indicates a used interference measurement mode to the terminal through 1 bit or 2 bits in top layer signaling/physical layer dynamic signaling.

Alternatively, the network side configures a plurality of sets of DMRS initialization parameters for the terminal through the top layer signaling, and indicates the terminal to use one of the plurality of sets of DMRS initialization parameters for the current interference measurement through the physical layer dynamic signaling;

the network side configures a plurality of sets of DMRS ports for the terminal through the top layer signaling, and indicates the terminal to use one of the plurality of sets of DMRS ports for the current interference measurement through the physical layer dynamic signaling;

the network side configures a plurality of sets of DMRS ports and DMRS initialization parameters corresponding to the ports for the terminal through the top layer signaling, and indicates the terminal to use one of the plurality of sets of DMRS ports and DMRS initialization parameters corresponding to the ports for the current interference measurement through the physical layer dynamic signaling;

the network side configures a plurality of sets of DMRS ports and interference measurement modes corresponding to the ports for the terminal through the top layer signaling, and indicates the terminal to use one of the plurality of sets of DMRS ports and interference measurement modes corresponding to the ports for the current interference measurement through the physical layer dynamic signaling; and the network side configures a plurality of sets of DMRS ports, interference measurement modes corresponding to the ports, and DMRS initialization parameters corresponding to the ports for the terminal through the top layer signaling, and indicates the terminal to use one of the plurality of sets of DMRS ports, interference measurement modes corresponding to the ports, and DMRS initialization parameters corresponding to the ports for the current interference measurement through the physical layer dynamic signaling.

Alternatively, the method further comprises:

there being a set of parameters in the plurality of sets of parameters configured by the top layer which is used for representing using the "power subtraction" interference measurement mode; or besides indicating which set of parameters in the plurality of sets of parameters is used for the current interference measurement through the physical layer dynamic signaling, indicating to represent using the "power subtraction" interference measurement mode to perform interference measurement through an additional state or signaling.

Alternatively, the method further comprises:

when indicating the DMRS ports used for interference measurement to the terminal through the interference measurement indication information, and when the indicated DMRS ports used for interference measurement and the DMRS ports used for transmitting the data of the terminal are orthogonal on REs in a time-frequency domain, the network side transmitting the zero-power signal on REs of the indicated DMRS ports used for interference measurement, and performing data mapping by means of rate matching or punching.

Alternatively, the method further comprises:

the interference measurement indication information acting on frequency domain bandwidth resources/physical resource block PRBs of downlink data service transmission corresponding to the terminal.

Alternatively, an interference measurement method comprises:

a terminal receiving interference measurement indication information sent by a network side, and performing interference measurement according to an indication of the interference measurement indication information, wherein the interference measurement indication information is used for indicating one or more kinds of the following information:

interference measurement modes used for performing interference measurement; and parameter configuration information used for interference measurement.

Alternatively, the interference measurement modes comprise one or more kinds of the following modes:

performing interference measurement through orthogonal demodulation reference signal DMRS ports, wherein the mode is to perform interference measurement through DMRS ports orthogonal to DMRS ports used for transmitting data of the terminal;

performing interference measurement through pseudo-orthogonal DMRS ports, wherein the mode is to perform interference measurement through DMRS ports pseudo-orthogonal to DMRS ports used for transmitting data of the terminal;

performing interference measurement through specified resource element REs, wherein the mode is, by transmitting a zero-power signal to the terminal on the specified REs, the terminal performing interference measurement through a received signal on the specified REs; and "power subtraction" interference measurement, wherein the mode is to perform interference measurement by subtracting useful signals from a total received signal or subtracting received powers of the useful signals from a total received signal power.

Alternatively, the parameter configuration information used for interference measurement comprises one or more kinds of the following information:

DMRS initialization parameters used for interference measurement; and

DMRS ports used for interference measurement.

Alternatively, performing interference measurement through the DMRS ports orthogonal to the DMRS ports used for transmitting the data of the terminal comprises:

the DMRS ports used for interference measurement and the DMRS ports used for transmitting the data of the terminal satisfying an orthogonal relationship, and the terminal having known related parameter information of interference signal transmission on the DMRS ports used for interference measurement.

Alternatively, performing interference measurement through the orthogonal DMRS ports comprises one or more kinds of the following modes:

time-frequency resource locations of the DMRS ports used for interference measurement and time-frequency resource locations of the DMRS ports used for transmitting the data of the terminal are overlapped, and the terminal performs interference measurement by using initialization parameters identical with and orthogonal masks different from those of the DMRS ports used for transmitting the data of the terminal; and time-frequency resource locations of the DMRS ports used for interference measurement and time-frequency resource locations of the DMRS ports used for transmitting the data of the terminal are different, and the terminal transmits a zero-power signal on the DMRS ports used for interference measurement, the terminal performs interference measurement through the DMRS initialization parameters and orthogonal masks of the DMRS ports used for interference measurement.

Alternatively, performing interference measurement through the DMRS ports pseudo-orthogonal to the DMRS ports used for transmitting the data of the terminal comprises:

the DMRS ports used for interference measurement and the DMRS ports used for transmitting the data of the terminal satisfying a pseudo-orthogonal relationship, and the terminal having known related parameter information of interference signal transmission on the DMRS ports used for interference measurement.

Alternatively, performing interference measurement through the pseudo-orthogonal DMRS ports comprises one or more kinds of the following modes:

time-frequency resource locations of the DMRS ports used for interference measurement and time-frequency resource locations of the DMRS ports used for transmitting the data of the terminal are overlapped, and the terminal performs interference measurement by using DMRS initialization parameters different from and orthogonal masks different from those of the DMRS ports used for transmitting the data of the terminal; and time-frequency resource locations of the DMRS ports used for interference measurement and time-frequency resource locations of the DMRS ports used for transmitting the data of the terminal are different, and the terminal transmits a non-zero-power signal on the DMRS ports used for interference measurement, the terminal performs interference measurement through the DMRS initialization parameters and orthogonal masks of the DMRS ports used for interference measurement.

Alternatively, performing interference measurement through the specified REs comprises one or more kinds of the following modes:

the specified REs are REs in locations where one or more DMRS ports, except DMRS ports used for transmitting data to the terminal, are located, the network side sends the zero-power signal to the terminal on the REs in locations where the one or more DMRS ports are located, and the terminal performs interference measurement through the received signal on the REs in locations where the DMRS ports are located; and the specified REs are part of REs in locations where the DMRS ports are located, the network side sends the zero-power signal to the terminal on the part of REs in locations where the DMRS ports are located, and the terminal performs interference measurement through the received signal on the part of REs in locations where the DMRS ports are located.

Alternatively, the network side indicates a used interference measurement mode to the terminal through 1 bit or 2 bits in top layer signaling/physical layer dynamic signaling.

Alternatively, the terminal determines a plurality of sets of DMRS initialization parameters by receiving the top layer signal from the network side, and determines one of the plurality of sets of DMRS initialization parameters used for the current interference measurement by receiving physical layer dynamic signaling;

the terminal determines a plurality of sets of DMRS ports by receiving the top layer signal from the network side, and determines one of the plurality of sets of DMRS ports used for the current interference measurement by receiving physical layer dynamic signaling;

the terminal determines a plurality of sets of DMRS ports and DMRS initialization parameters corresponding to the ports by receiving the top layer signal from the network side, and determines one of the plurality of sets of DMRS ports and DMRS initialization parameters corresponding to the ports used for the current interference measurement by receiving physical layer dynamic signaling;

the terminal determines a plurality of sets of DMRS ports and interference measurement modes corresponding to the ports by receiving the top layer signal from the network side, and determines one of the plurality of sets of DMRS ports and interference measurement modes corresponding to the ports used for the current interference measurement by receiving physical layer dynamic signaling; and the terminal determines a plurality of sets of DMRS ports, interference measurement modes corresponding to the ports, and DMRS initialization parameters corresponding to the ports by receiving the top layer signal from the network side, and determines one of the plurality of sets of DMRS ports, interference measurement modes corresponding to the ports, and DMRS initialization parameters corresponding to the ports used for the current interference measurement by receiving physical layer dynamic signaling.

Alternatively, the method further comprises:

there being a set of parameters in the plurality of sets of parameters sent by the network side and received by the terminal which is used for representing using the "power subtraction" interference measurement mode; or besides determining which set of parameters in the plurality of sets of parameters is used for the current interference measurement through a received physical layer dynamic signaling, the terminal determining whether to use the "power subtraction" interference measurement mode to perform interference measurement through an additional state or signaling.

Alternatively, the method further comprises:

when the terminal determines the DMRS ports used for interference measurement through the received interference measurement indication information, and when the DMRS ports used for interference measurement and the DMRS ports used for transmitting the data of the terminal are orthogonal on REs in a time-frequency domain, the terminal extracting data according to rate matching or punching rules of data mapping on REs corresponding to the DMRS ports used for interference measurement.

Alternatively, the method further comprises:

when the terminal determines the DMRS ports used for interference measurement through the received interference measurement indication information, when REs in a time-frequency domain of the DMRS ports used for interference measurement and REs in a time-frequency domain of the DMRS ports used for transmitting the data of the terminal are overlapped, the terminal defaulting that DMRS initialization parameters corresponding to the DMRS ports used for interference measurement and DMRS initialization parameters corresponding to the DMRS ports used for transmitting the data of the terminal are identical, and performing interference measurement through the orthogonal DMRS ports, and when REs in a time-frequency domain of the DMRS ports used for interference measurement and REs in a time-frequency domain of the DMRS ports used for transmitting the data of the terminal are not overlapped, the terminal performing interference measurement by means of averaging interference channel measurement results within physical resource block PRBs.

Alternatively, the method further comprises:

when the interference measurement indication information received by the terminal indicates to perform interference measurement through the orthogonal DMRS ports, the terminal defaulting that the DMRS ports used for interference measurement and the DMRS ports used for transmitting the data of the terminal occupy identical time-frequency resource locations, and performing interference measurement based on identical DMRS initializations;

when the interference measurement indication information received by the terminal indicates to perform interference measurement through the pseudo-orthogonal DMRS ports, the terminal defaulting that the DMRS ports used for interference measurement and the DMRS ports used for transmitting the data of the terminal occupy identical time-frequency resource locations, and performing interference measurement based on different DMRS initialization parameters; and when the interference measurement indication information received by the terminal indicates to perform interference measurement through the specified REs, the terminal defaulting that locations of REs occupied by the DMRS ports used for interference measurement and locations of REs occupied by the DMRS ports used for transmitting the data of the terminal are different, and the terminal defaulting that the network side transmits the zero-power signal on DMRS REs used for interference measurement, and extracting data according to rate matching or punching rules of data mapping on the DMRS REs.

Alternatively, the method further comprises:

the terminal receiving the interference measurement indication information, and performing interference measurement in frequency domain bandwidth resources/physical resource block PRBs in which downlink data transmission corresponding to the terminal is located.

Alternatively, a network side device comprises: an information generation unit and an information sending unit, wherein:

the information generation unit is configured to generate interference estimation indication information;

the information sending unit is configured to send interference measurement indication information to a terminal to indicate the terminal to perform interference measurement;

wherein, the interference measurement indication information is used for indicating one or more kinds of the following information to the terminal:

interference measurement modes used for performing interference measurement; and parameter configuration information used for interference measurement.

Alternatively, the interference measurement modes comprise one or more kinds of the following modes:

performing interference measurement through orthogonal demodulation reference signal DMRS ports, wherein the mode is to perform interference measurement through DMRS ports orthogonal to DMRS ports used for transmitting data of the terminal;

performing interference measurement through pseudo-orthogonal DMRS ports, wherein the mode is to perform interference measurement through DMRS ports pseudo-orthogonal to DMRS ports used for transmitting data of the terminal;

performing interference measurement through specified resource element REs, wherein the mode is, by transmitting a zero-power signal to the terminal on the specified REs, the terminal performing interference measurement through a received signal on the specified REs; and "power subtraction" interference measurement, wherein the mode is to perform interference measurement by subtracting useful signals from a total received signal or subtracting received powers of the useful signals from a total received signal power.

Alternatively, the parameter configuration information used for interference measurement comprises one or more kinds of the following information:

DMRS initialization parameters used for interference measurement; and

DMRS ports used for interference measurement.

Alternatively, the DMRS initialization parameters used for interference measurement comprise: at least one of a scramble code identity related to a DMRS sequence used for interference measurement, a cell identity related to a DMRS sequence used for interference measurement and a subframe/time slot/physical resource block PRB in which a DMRS used for interference measurement is located; and the DMRS ports used for interference measurement comprise at least one of DMRS ports 7~14, or comprise at least one of DMRS ports 107~110.

Alternatively, when the parameter configuration information used for interference measurement simultaneously comprises the DMRS initialization parameters used for interference measurement and the DMRS ports used for interference measurement, the information generation unit configures the DMRS initialization parameters for each DMRS port independently.

Alternatively, performing interference measurement through the DMRS ports orthogonal to the DMRS ports used for transmitting the data of the terminal comprises:

the DMRS ports used for interference measurement and the DMRS ports used for transmitting the data of the terminal satisfying an orthogonal relationship, and the terminal having known related parameter information of interference signal transmission on the DMRS ports used for interference measurement.

Alternatively, performing interference measurement through the orthogonal DMRS ports comprises one or more kinds of the following modes:

time-frequency resource locations of the DMRS ports used for interference measurement and time-frequency resource locations of the DMRS ports used for transmitting the data of the terminal are overlapped, and the terminal performs interference measurement by using initialization parameters identical with and orthogonal masks different from those of the DMRS ports used for transmitting the data of the terminal; and time-frequency resource locations of the DMRS ports used for interference measurement and time-frequency resource locations of the DMRS ports used for transmitting the data of the terminal are different, and the terminal transmits a zero-power signal on the DMRS ports used for interference measurement, the terminal performs interference measurement through the DMRS initialization parameters and orthogonal masks of the DMRS ports used for interference measurement.

Alternatively, performing interference measurement through the DMRS ports pseudo-orthogonal to the DMRS ports used for transmitting the data of the terminal comprises:

the DMRS ports used for interference measurement and the DMRS ports used for transmitting the data of the terminal satisfying a pseudo-orthogonal relationship, and the terminal having known related parameter information of interference signal transmission on the DMRS ports used for interference measurement.

Alternatively, performing interference measurement through the pseudo-orthogonal DMRS ports comprises one or more kinds of the following modes:

time-frequency resource locations of the DMRS ports used for interference measurement and time-frequency resource locations of the DMRS ports used for transmitting the data of the terminal are overlapped, and the terminal performs interference measurement by using DMRS initialization parameters different from and orthogonal masks different from those of the DMRS ports used for transmitting the data of the terminal; and time-frequency resource locations of the DMRS ports used for interference measurement and time-frequency resource locations of the DMRS ports used for transmitting the data of the terminal are different, and the terminal transmits a non-zero-power signal on the DMRS ports used for interference measurement, the terminal performs interference measurement through the DMRS initialization parameters and orthogonal masks of the DMRS ports used for interference measurement.

Alternatively, performing interference measurement through the specified REs comprises one or more kinds of the following modes:

the specified REs are REs in locations where one or more DMRS ports, except DMRS ports used for transmitting data to the terminal, are located, the network side sends the zero-power signal to the terminal on the REs in locations where the one or more DMRS ports are located, and the terminal performs interference measurement through the received signal on the REs in locations where the DMRS ports are located; and the specified REs are part of REs in locations where the DMRS ports are located, the network side sends the zero-power signal to the terminal on the part of REs in locations where the DMRS ports are located, and the terminal performs interference measurement through the received signal on the part of REs in locations where the DMRS ports are located.

Alternatively, the information sending unit is configured to indicate a used interference measurement mode to the terminal through 1 bit or 2 bits in top layer signaling/physical layer dynamic signaling.

Alternatively, the information sending unit is configured to configure a plurality of sets of DMRS initialization parameters for the terminal through the top layer signaling, and indicate the terminal to use one of the plurality of sets of DMRS initialization parameters for the current interference measurement through the physical layer dynamic signaling;

the information sending unit is configured to configure a plurality of sets of DMRS ports for the terminal through the top layer signaling, and indicate the terminal to use one of the plurality of sets of DMRS ports for the current interference measurement through the physical layer dynamic signaling;

the information sending unit is configured to configure a plurality of sets of DMRS ports and DMRS initialization parameters corresponding to the ports for the terminal through the top layer signaling, and indicate the terminal to use one of the plurality of sets of DMRS ports and DMRS initialization parameters corresponding to the ports for the current interference measurement through the physical layer dynamic signaling;

the information sending unit is configured to configure a plurality of sets of DMRS ports and interference measurement modes corresponding to the ports for the terminal through the top layer signaling, and indicate the terminal to use one of the plurality of sets of DMRS ports and interference measurement modes corresponding to the ports for the current interference measurement through the physical layer dynamic signaling; and the information sending unit is configured to configure a plurality of sets of DMRS ports, interference measurement modes corresponding to the ports, and DMRS initialization parameters corresponding to the ports for the terminal through the top layer signaling, and indicate the terminal to use one of the plurality of sets of DMRS ports, interference measurement modes corresponding to the ports, and DMRS initialization parameters corresponding to the ports for the current interference measurement through the physical layer dynamic signaling.

Alternatively, the information sending unit is further configured to make a set of parameters exist in the configured plurality of sets of parameters to be used for representing using the "power subtraction" interference measurement mode; or besides indicating which set of parameters in the plurality of sets of parameters is used for the current interference measurement through the physical layer dynamic signaling, indicate to represent using the "power subtraction" interference measurement mode to perform interference measurement through an additional state or signaling.

Alternatively, the information sending unit is further configured to: when indicating the DMRS ports used for interference measurement to the terminal through the interference measurement indication information, and when the indicated DMRS ports used for interference measurement and the DMRS ports used for transmitting the data of the terminal are orthogonal on REs in a time-frequency domain, transmit the zero-power signal on REs of the indicated DMRS ports used for interference measurement, and perform data mapping by means of rate matching or punching.

Alternatively, the information sending unit is further configured to make the interference measurement indication information act on frequency domain bandwidth resources/physical resource block PRBs of downlink data service transmission corresponding to the terminal.

Alternatively, a terminal device comprises: a receiving unit and an interference measurement unit, wherein:

the receiving unit is configured to receive interference measurement indication information sent by a network side;

the interference measurement unit is configured to perform interference measurement according to an indication of the interference measurement indication information;

wherein, the interference measurement indication information is used for indicating one or more kinds of the following information:

interference measurement modes used for performing interference measurement; and parameter configuration information used for interference measurement.

Alternatively, the interference measurement modes comprise one or more kinds of the following modes:

performing interference measurement through orthogonal demodulation reference signal DMRS ports, wherein the mode is to perform interference measurement through DMRS ports orthogonal to DMRS ports used for transmitting data of the terminal;

performing interference measurement through pseudo-orthogonal DMRS ports, wherein the mode is to perform interference measurement through DMRS ports pseudo-orthogonal to DMRS ports used for transmitting data of the terminal;

performing interference measurement through specified resource element REs, wherein the mode is, by transmitting a zero-power signal to the terminal on the specified REs, the terminal performing interference measurement through a received signal on the specified REs; and "power subtraction" interference measurement, wherein the mode is to perform interference measurement by subtracting useful signals from a total received signal or subtracting received powers of the useful signals from a total received signal power.

Alternatively, the parameter configuration information used for interference measurement comprises one or more kinds of the following information:

DMRS initialization parameters used for interference measurement; and

DMRS ports used for interference measurement.

Alternatively, performing interference measurement through the DMRS ports orthogonal to the DMRS ports used for transmitting the data of the terminal comprises:

the DMRS ports used for interference measurement and the DMRS ports used for transmitting the data of the terminal satisfying an orthogonal relationship, and the terminal having known related parameter information of interference signal transmission on the DMRS ports used for interference measurement.

Alternatively, performing interference measurement through the orthogonal DMRS ports comprises one or more kinds of the following modes:

time-frequency resource locations of the DMRS ports used for interference measurement and time-frequency resource locations of the DMRS ports used for transmitting the data of the terminal are overlapped, and the terminal performs interference measurement by using initialization parameters identical with and orthogonal masks different from those of the DMRS ports used for transmitting the data of the terminal; and time-frequency resource locations of the DMRS ports used for interference measurement and time-frequency resource locations of the DMRS ports used for transmitting the data of the terminal are different, and the terminal transmits a zero-power signal on the DMRS ports used for interference measurement, the terminal performs interference measurement through the DMRS initialization parameters and orthogonal masks of the DMRS ports used for interference measurement.

Alternatively, performing interference measurement through the DMRS ports pseudo-orthogonal to the DMRS ports used for transmitting the data of the terminal comprises:

the DMRS ports used for interference measurement and the DMRS ports used for transmitting the data of the terminal satisfying a pseudo-orthogonal relationship, and the terminal having known related parameter information of interference signal transmission on the DMRS ports used for interference measurement.

Alternatively, performing interference measurement through the pseudo-orthogonal DMRS ports comprises one or more kinds of the following modes:

time-frequency resource locations of the DMRS ports used for interference measurement and time-frequency resource locations of the DMRS ports used for transmitting the data of the terminal are overlapped, and the terminal performs interference measurement by using DMRS initialization parameters different from and orthogonal masks different from those of the DMRS ports used for transmitting the data of the terminal; and time-frequency resource locations of the DMRS ports used for interference measurement and time-frequency resource locations of the DMRS ports used for transmitting the data of the terminal are different, and the terminal transmits a non-zero-power signal on the DMRS ports used for interference measurement, the terminal performs interference measurement through the DMRS initialization parameters and orthogonal masks of the DMRS ports used for interference measurement.

Alternatively, performing interference measurement through the specified REs comprises one or more kinds of the following modes:

the specified REs are REs in locations where one or more DMRS ports, except DMRS ports used for transmitting data to the terminal, are located, the network side sends the zero-power signal to the terminal on the REs in locations where the one or more DMRS ports are located, and the terminal performs interference measurement through the received signal on the REs in locations where the DMRS ports are located; and the specified REs are part of REs in locations where the DMRS ports are located, the network side sends the zero-power signal to the terminal on the part of REs in locations where the DMRS ports are located, and the terminal performs interference measurement through the received signal on the part of REs in locations where the DMRS ports are located.

Alternatively, the receiving unit is configured to receive a used interference measurement mode indicated by the network side through 1 bit or 2 bits in top layer signaling/physical layer dynamic signaling.

Alternatively, the receiving unit is configured to determine a plurality of sets of DMRS initialization parameters by receiving the top layer signal from the network side, and determine one of the plurality of sets of DMRS initialization parameters used for the current interference measurement by receiving physical layer dynamic signaling;

the receiving unit is configured to determine a plurality of sets of DMRS ports by receiving the top layer signal from the network side, and determine one of the plurality of sets of DMRS ports used for the current interference measurement by receiving physical layer dynamic signaling;

the receiving unit is configured to determine a plurality of sets of DMRS ports and DMRS initialization parameters corresponding to the ports by receiving the top layer signal from the network side, and determine one of the plurality of sets of DMRS ports and DMRS initialization parameters corresponding to the ports used for the current interference measurement by receiving physical layer dynamic signaling;

the receiving unit is configured to determine a plurality of sets of DMRS ports and interference measurement modes corresponding to the ports by receiving the top layer signal from the network side, and determine one of the plurality of sets of DMRS ports and interference measurement modes corresponding to the ports used for the current interference measurement by receiving physical layer dynamic signaling;

the receiving unit is configured to determine a plurality of sets of DMRS ports, interference measurement modes corresponding to the ports, and DMRS initialization parameters corresponding to the ports by receiving the top layer signal from the network side, and determine one of the plurality of sets of DMRS ports, interference measurement modes corresponding to the ports, and DMRS initialization parameters corresponding to the ports used for the current interference measurement by receiving physical layer dynamic signaling.

Alternatively, the receiving unit is further configured to make a set of parameters exist in the received plurality of sets of parameters sent by the network side to be used for representing using the "power subtraction" interference measurement mode; or besides determining which set of parameters in the plurality of sets of parameters is used for the current interference measurement through a received physical layer dynamic signaling, the interference measurement unit determines whether to use the "power subtraction" interference measurement mode to perform interference measurement through an additional state or signaling.

Alternatively, the interference measurement unit is further configured to: when the DMRS ports used for interference measurement are determined through the received interference measurement indication information, and when the DMRS ports used for interference measurement and the DMRS ports used for transmitting the data of the terminal are orthogonal on REs in a time-frequency domain, extract data according to rate matching or punching rules of data mapping on REs corresponding to the DMRS ports used for interference measurement.

Alternatively, the interference measurement unit is further configured to: when the DMRS ports used for interference measurement are determined through the received interference measurement indication information, when REs in a time-frequency domain of the DMRS ports used for interference measurement and REs in a time-frequency domain of the DMRS ports used for transmitting the data of the terminal are overlapped, default that DMRS initialization parameters corresponding to the DMRS ports used for interference measurement and DMRS initialization parameters corresponding to the DMRS ports used for transmitting the data of the terminal are identical, and perform interference measurement through the orthogonal DMRS ports, and when REs in a time-frequency domain of the DMRS ports used for interference measurement and REs in a time-frequency domain of the DMRS ports used for transmitting the data of the terminal are not overlapped, perform interference measurement by means of averaging interference channel measurement results within physical resource block PRBs.

Alternatively, the interference measurement unit is further configured to: when the received interference measurement indication information indicates to perform interference measurement through the orthogonal DMRS ports, default that the DMRS ports used for interference measurement and the DMRS ports used for transmitting the data of the terminal occupy identical time-frequency resource locations, and perform interference measurement based on identical DMRS initializations;

the interference measurement unit is further configured to: when the received interference measurement indication information indicates to perform interference measurement through the pseudo-orthogonal DMRS ports, default that the DMRS ports used for interference measurement and the DMRS ports used for transmitting the data of the terminal occupy identical time-frequency resource locations, and perform interference measurement based on different DMRS initialization parameters; and the interference measurement unit is further configured to: when the received interference measurement indication information indicates to perform interference measurement through the specified REs, default that locations of REs occupied by the DMRS ports used for interference measurement and locations of REs occupied by the DMRS ports used for transmitting the data of the terminal are different, and default that the network side transmits the zero-power signal on DMRS REs used for interference measurement, and extract data according to rate matching or punching rules of data mapping on the DMRS REs.

Alternatively, the interference measurement unit is further configured to receive the interference measurement indication information, and perform interference measurement in frequency domain bandwidth resources/physical resource block PRBs in which downlink data transmission corresponding to the terminal is located.

In conclusion, in the embodiments of the present invention, with the assistance of network signaling, the interference measurement effect on data channels and control channels is improved, so as to improve the interference cancellation/interference suppression effect of the receiver, and guarantee the communication quality in the condition of increased network capacity.

PREFERRED EMBODIMENTS OF THE INVENTION

Figure 1:
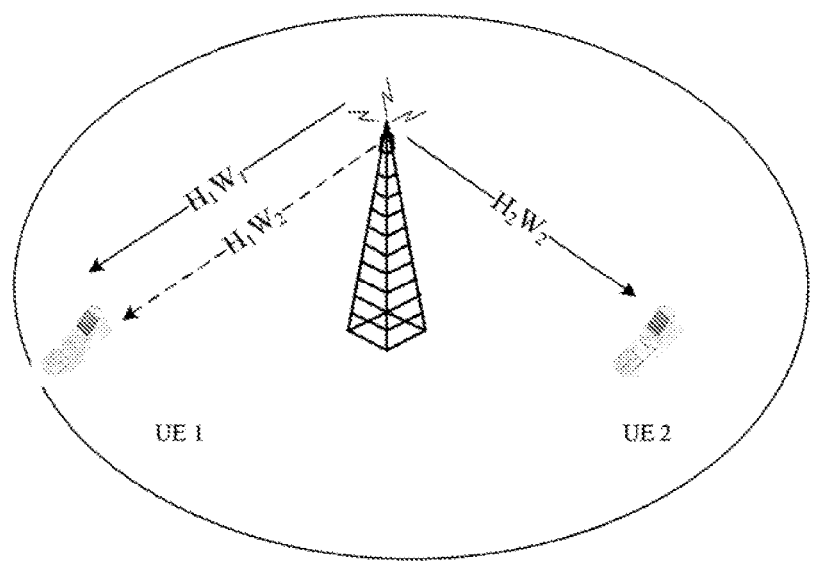
FIG. 1 is a schematic diagram of interference of a pairing user within a cell in the related art.
Figure 2:
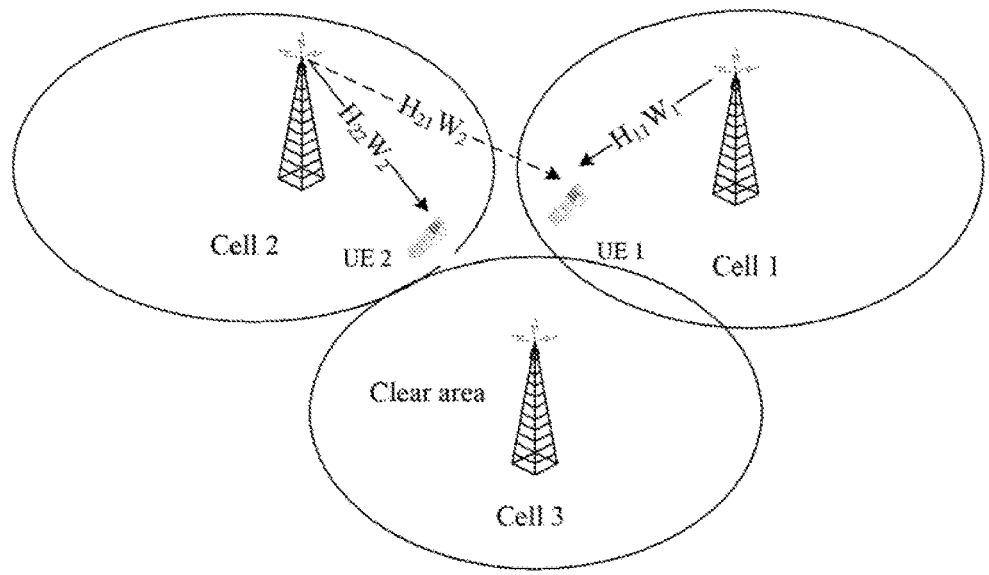
FIG. 2 is a schematic diagram of interference of a pairing user between cells in the related art.

In an Advanced Long Term Evolution (LTE-A) system, in order to reduce the pilot overhead and improve the accuracy of channel estimation of signals, a Demodulation Reference Signal (DMRS) is introduced to be used for channel estimation of a Physical Downlink Shared Channel (PDSCH) and enhanced Physical Downlink Control Channel (ePDCCH), to complete demodulation of data channels, and precoding information of corresponding PDSCH/ePDCCH is carried in the DMRS transmission. However, the demodulation performance is not only related to the accuracy of channel estimation, but it is also in an important relationship with the accuracy of interference measurement.

In the LTE/LTE-A system, the received signal of a receiver on the kth subcarrier and lth OFDM symbol ($N_{Rx} \times 1$ dimension, wherein $N_{Rx}$ represents the number of receiving antennas) can be indicated as a sum of three parts, the signal of the receiver itself $\overline{H}_1(k,l)d_1(k,l)$, the interference signal $\overline{H}_j(k,l)d_j(k,l)(j>1)$, and the noise $n(k,l)$:

$$r(k, l) = \overline{H}_1(k, l)d_1(k, l) + \sum_{j=2} \overline{H}_j(k, l)d_j(k, l) + n(k, l);$$

wherein, $d_j(k,l)$ and $\overline{H}_j(k,l)$ respectively represent an $r \times 1$-dimensional transmitting signal vector and an $N_{Tx} \times r$-dimensional equivalent channel matrix between the jth cell and the terminal, wherein $N_{Tx}$ represents the number of transmitting antennas, r represents a transmitting layer number. $\overline{H}_j(k,l) = H_j(k,l)P_j(k,l)$, wherein $H_j(k,l)$ is a $N_{Rx} \times N_{Tx}$-dimensional channel matrix, $P_j(k,l)$ is a $N_{Tx} \times r$-dimensional precoding matrix. And each $H_j(k,l)$ also contains $N_{Rx}$ branches $$H_j \begin{bmatrix} (H_{j,1})^H \\ (H_{j,2})^H \\ \vdots \\ (H_{j,N_{Rx}})^H \end{bmatrix},$$

wherein $H_{j,i}$ is a corresponding channel matrix of $N_{Tx} \times 1$ dimension on the ith receiving antenna. An estimation signal $\hat{d}_1(k,l)$ of a UE terminal is r×1-dimensional, and it can be obtained through a receiving weight $W_{RX,1}(k,l)$ of r×$N_{Rx}$ dimension:

$$\hat{d}_1(k,l)=W_{RX,1}(k,l)r(k,l);$$

different $W_{RX,1}(k,l)$ is define different receivers, for example, a receiving weight of an MRC receiver can be indicated as:

$$W_{RX,1}(k,l)=\overline{H}_1^H(k,l);$$

wherein $\overline{H}_1(k,l)$ is an estimated channel matrix.

With regard to an MMSE receiver, a receiving weight can be indicated as:

$$W_{RX,1}(k,l)=\overline{H}_1^H(k,l)R^{-1}, R=P_1\overline{H}_1(k,l)\overline{H}_1^H(k,l)+\sigma^2 I;$$

wherein R represents an estimated interference covariance matrix, $\sigma^2$ is the noise power, and $P_1$ is the transmitting signal power of the serving cell equal to $E[|d_1(k,l)|^2]$.

With regard to an MMSE-IRC receiver, a receiving weight can be indicated as:

$$W_{RX,1}(k,l)=\hat{\overline{H}}_1^H(k,l)R^{-1},$$

$$R=P_1\hat{\overline{H}}_1^H(k,l)\hat{\overline{H}}_1^H(k,l)+\sum_{j=2}\hat{\overline{H}}_j(k,l)\hat{\overline{H}}_j^H(k,l)+\sigma^2 I;$$

wherein, $\overline{H}_j(k,l)(j>1)$ is an estimated equivalent channel matrix of interference signals.

In a case of measuring interference through the DMRS, a receiving weight is:

$$R=P_1\hat{\overline{H}}_1(k,l)\hat{\overline{H}}_1^H(k,l)+\frac{1}{N_{sp}}\sum_{k,l\in DMRS}\tilde{r}(k,l)\tilde{r}(k,l)^H;$$

wherein $N_{sp}$ refers to the number of DMRS resource element REs used for interference channel estimation.

In a case of measuring interference through the data (PDSCH or ePDCCH), a receiving weight is:

$$R=P_1\hat{\overline{H}}_1(k,l)\hat{\overline{H}}_1^H(k,l)+\frac{1}{N_{sp}}\sum_{k,l\in PDSCH/ePDCCH}\tilde{r}(k,l)\tilde{r}(k,l)^H;$$

wherein $N_{sp}$ refers to the number of PDSCH resource element REs used for interference channel estimation.

Wherein, it should be noted that, there may be a category of special interference sources in the interference sources, namely interference of a pairing user within the cell, it is assumed that j=2 is the interference of the pairing user within the cell, at this point:

$$\overline{H}_2(k,l)=H_2(k,l)P_2(k,l)=H_1(k,l)P_2(k,l);$$

The related document/art has proved that the demodulation performance is substantially improved by using the MMSE-IRC receiver when compared to the traditional MRC receiver or MMSE receiver, the reason is that the MMSE-IRC receiver can obtain a more accurate receiving weight by using the interference channel covariance matrix. Therefore, acquiring more accurate interference channel information is an effective way to improve the receiving performance in the condition of MMSE-IRC receiver or advanced receivers.

In the LTE related art, especially with respect to the transmission mode 8/9/10, whether there exists a pairing user is transparent to a target user in the process of the network side transmitting a PDSCH to the target user (terminal). Only during single-port transmission based on the DMRS, can the target user blindly estimate interference of the pairing user through another DMRS port (one of the port 7 and port 8 different from the port used by the target user). In order to estimate interference of the pairing user in most cases, the network side is required to additionally configure information related to the pairing user to the target user, thereby guiding the target user to better estimate the channel of the pairing user and better perform interference cancellation. The pairing user mentioned here refers to a user allocated onto the same physical resource with the target user. The pairing user and the target user can be located in the same cell, and they also can be located in different cells.

Figure 8:
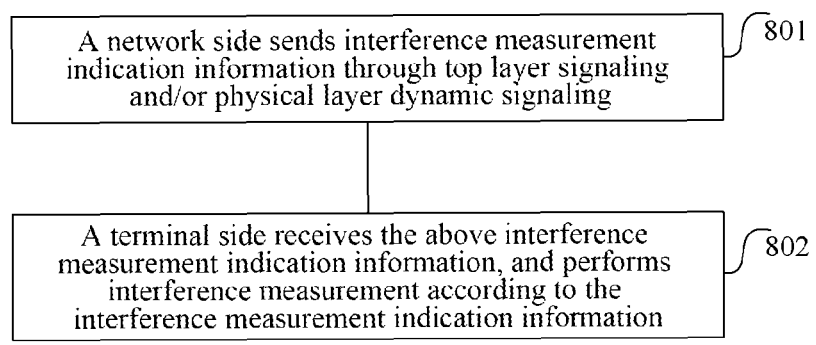
FIG. 8 is a flow chart of an interference measurement method according to the embodiment of the present document.

Therefore, the embodiment provides an interference measurement method, and as shown in FIG. 8, the following steps are included.

In step 801, a network side sends interference measurement indication information through top layer signaling and/or physical layer dynamic signaling.

In step 802, a terminal side receives the above interference measurement indication information, and performs interference measurement according to the interference measurement indication information.

In the step 801, the interference measurement indication information is used for indicating interference measurement modes used for performing interference measurement and/or parameter configuration information used for interference measurement, and the physical layer dynamic signaling includes a downlink control authorization signaling and/or an uplink control authorization signaling in a physical downlink control channel (PDCCH)/enhanced physical downlink control channel (ePDCCH). Wherein, preferably, the information indicated by the interference measurement indication information only acts on frequency domain bandwidth (physical resource block PRB) resources of downlink data service transmission corresponding to the terminal.

The interference measurement modes at least include: one of a mode of performing interference measurement through orthogonal DMRS ports, a mode of performing interference measurement through pseudo-orthogonal DMRS ports, a mode of performing interference measurement through specified REs, and a "power subtraction" interference measurement mode. Each interference measurement mode will be described respectively below, wherein:

(1) The mode of performing interference measurement through the orthogonal DMRS ports refers to that the DMRS ports used for interference measurement and the DMRS ports used for transmitting data of the terminal satisfy an orthogonal relationship (code division orthogonality or time-frequency resource location orthogonality), and the terminal having known related parameter information of interference signal transmission on the DMRS ports used for interference measurement. Correspondingly, the following two implementation ways are included.

Figure 3A:
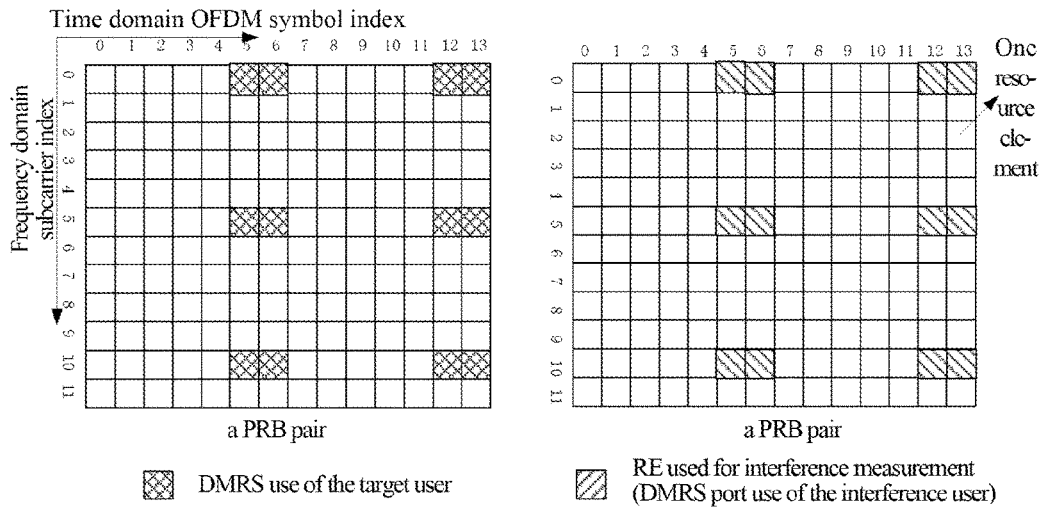
FIG. 3A is a schematic diagram of a configuration mode under the interference measurement mode based on orthogonal DMRS ports or interference measurement mode based on pseudo-orthogonal DMRS ports in the embodiment of the present document.

In Way 1, The time-frequency resource locations of the DMRS ports used for interference measurement and the time-frequency resource locations of the DMRS ports used for transmitting the data of the terminal are overlapped, and the terminal performs interference measurement by using initialization parameters identical with and orthogonal masks different from those of the DMRS ports used for transmitting the data of the terminal. For example, DMRS ports of the interference signal and DMRS ports of the target user occupy the same REs and possess the same DMRS initialization parameters and use orthogonal masks that are mutually orthogonal (that is, the DMRS ports of the target user and the DMRS ports of the interference signal are in code division orthogonality), FIG. 3A gives a schematic diagram of orthogonality based on the code domain, the DMRS ports of the target user and the DMRS ports of the interference signal transmission are orthogonal in the code domain, for example, the target user uses an orthogonal mask [1 1] on each pair of DMRS REs , the interference user uses an orthogonal mask [1 −1] on each pair of DMRS REs , and DMRS reference signal sequences of the two are identical.

Figure 3B:
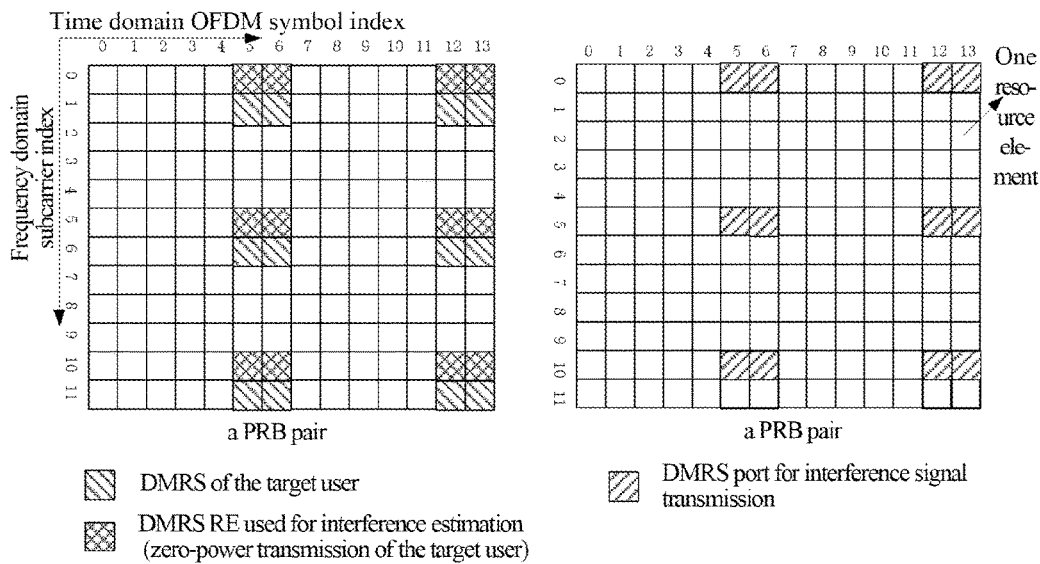
FIG. 3B is a schematic diagram of a configuration mode under the interference measurement mode based on orthogonal DMRS ports or interference measurement based on locations of specified REs in the embodiment of the present document.

In Way 2, The time-frequency resource locations of the DMRS ports used for interference measurement and the time-frequency resource locations of the DMRS ports used for transmitting the data of the terminal are different, and the terminal transmits a zero-power signal on the DMRS ports used for interference measurement, the terminal performs interference measurement through DMRS initialization parameters and orthogonal masks related to the DMRS ports used for interference measurement. For example, the DMRS ports of the interference signal and the DMRS ports of the target user occupy different DMRS REs and are mutually orthogonal (that is, time-frequency resource locations of the DMRS ports of the target user and time-frequency resource locations of the DMRS ports of the interference signal are orthogonal), and the target user has known the DMRS initialization parameters used by the DMRS ports corresponding to interference signal transmission, FIG. 3B gives a schematic diagram of the DMRS ports of the interference signal and the DMRS ports of the signal being orthogonal in the time-frequency domain, the DMRS ports used for transmitting the data of the terminal and the DMRS ports used by the interference signal are orthogonal in the time-frequency domain, the target user transmits a zero-power signal at locations of REs where the DMRS ports used by the interference signal are located. Transmitting the zero-power signal can be implemented by means of rate matching or punching. At this point, when the terminal has known the DMRS initialization parameters corresponding to the DMRS ports used in the interference signal transmission, equivalent channel information of the interference signal can be directly estimated, and when the interference measurement is performed through the orthogonal DMRS ports, the terminal can directly and more accurately measure to obtain channel information of equivalent channels corresponding to unknown interference sources on each DMRS RE.

(2) Performing interference measurement in a pseudo-orthogonal way refers to that the DMRS ports used for interference measurement (measurement) and the DMRS ports used for transmitting data of the terminal do not satisfy an orthogonal relationship, but the terminal has known related parameter information of interference signal transmission on the DMRS ports used for interference measurement. Correspondingly, the following two ways are included.

In Way 1, The time-frequency resource locations of the DMRS ports used for interference measurement and the time-frequency resource locations of the DMRS ports used for transmitting the data of the terminal are overlapped, and the terminal performs interference measurement by using initialization parameters different from and orthogonal masks different from those of the DMRS ports used for transmitting the data of the terminal. For example, as shown in FIG. 3A, the DMRS initialization parameters used in the interference signal transmission are different from the DMRS initialization parameters of the target user. The terminal can roughly obtain equivalent channel information of interference sources by averaging interference channel coefficients estimated at the locations of DMRS REs of the interference signal.

Figure 4:
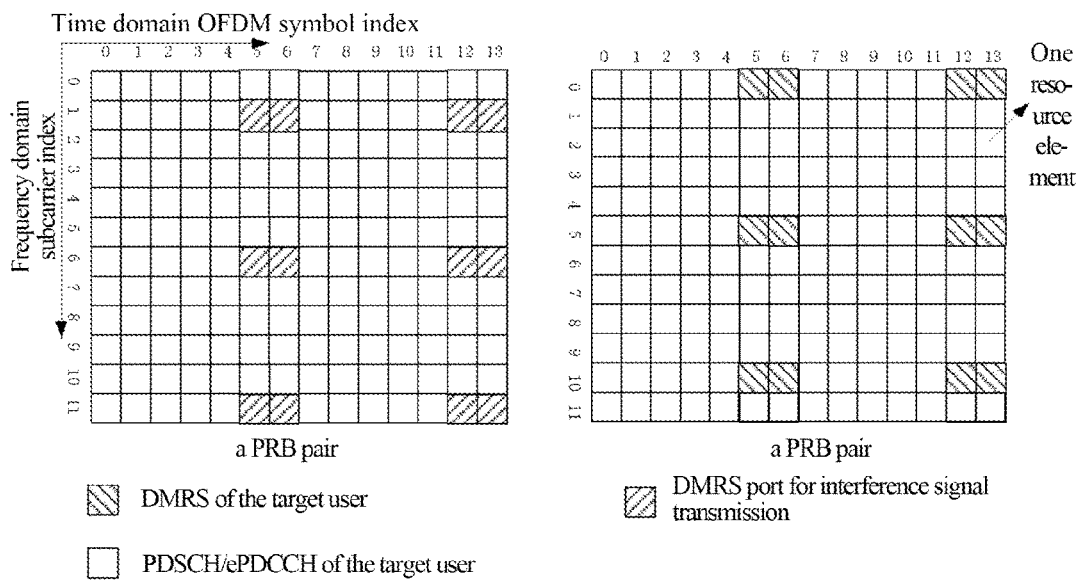
FIG. 4 is a schematic diagram of a configuration mode under the interference measurement mode based on pseudo-orthogonal DMRS ports in the embodiment of the present document.

In Way 2, The time-frequency resource locations of the DMRS ports used for interference measurement and the time-frequency resource locations of the DMRS ports used for transmitting the data of the terminal are different, and the terminal transmits a non-zero-power signal on the DMRS ports used for interference measurement, the terminal performs interference measurement through DMRS initialization parameters and orthogonal masks related to the DMRS ports used for interference measurement. For example, as shown in FIG. 4, the terminal has known the DMRS initialization parameters used in the interference signal transmission, but on the mapped REs of the DMRS ports used by the interference signal, the target user maps other data. The terminal can roughly obtain equivalent channel information of interference sources by averaging interference channel coefficients estimated at the locations of DMRS REs of the interference signal.

(3) Performing interference measurement through the specified REs refers to that the network side transmits a zero-power signal to the target user on the specified REs, and the target user does not know related parameters of interference signal transmission in locations of REs used for interference measurement, or the terminal has known the related parameters of interference signal transmission in locations of REs used for interference measurement but the related parameters of interference signal transmission in locations of REs for the interference measurement are not used in the interference measurement process, the terminal directly uses the received signal in locations of the specified REs to perform interference measurement. Correspondingly, the following two ways are included.

Figure 5A:
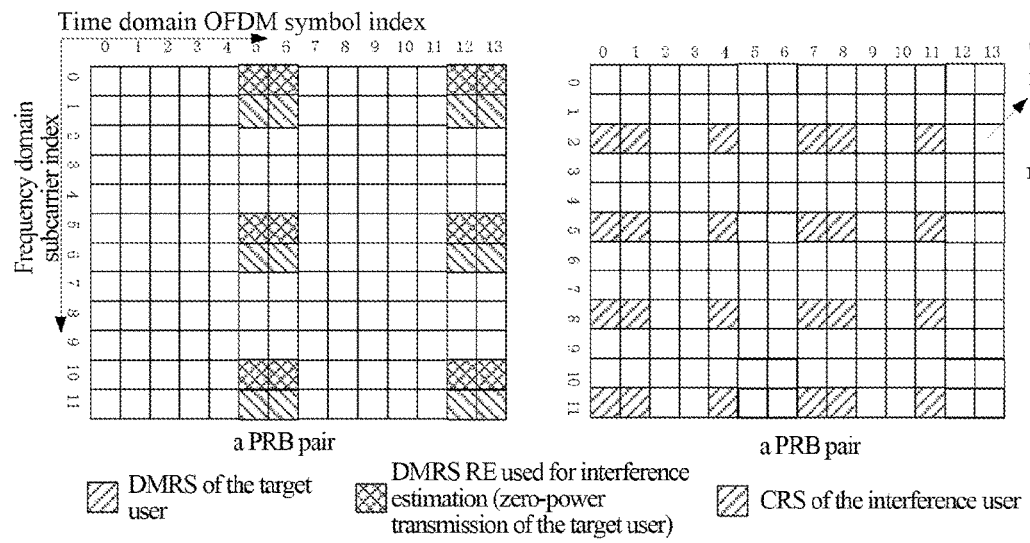
FIG. 5A is a schematic diagram of a configuration mode of performing interference measurement based on locations of specified REs in the embodiment of the present document.

In Way 1, The specified REs are resource element REs in locations where one or more DMRS ports, except DMRS ports used for transmitting data to the terminal, are located. For example, as shown in FIG. 3B, the network side transmits a zero-power signal to the target user in the locations of DMRS ports 7/8, and does not know or does not use pilot-related parameter information used in identical locations during the interference signal transmission; or, as shown in FIG. 5A, the interference signal transmits data of transmission service/control signal in locations of the DMRS REs where the network side transmits the zero-power signal to the target user, and the target user is hard to acquire the data-related information of transmission service/control signal in the interference transmission. The target user directly measures to obtain the interference information through the received signal on the specified REs.

Figure 5B:
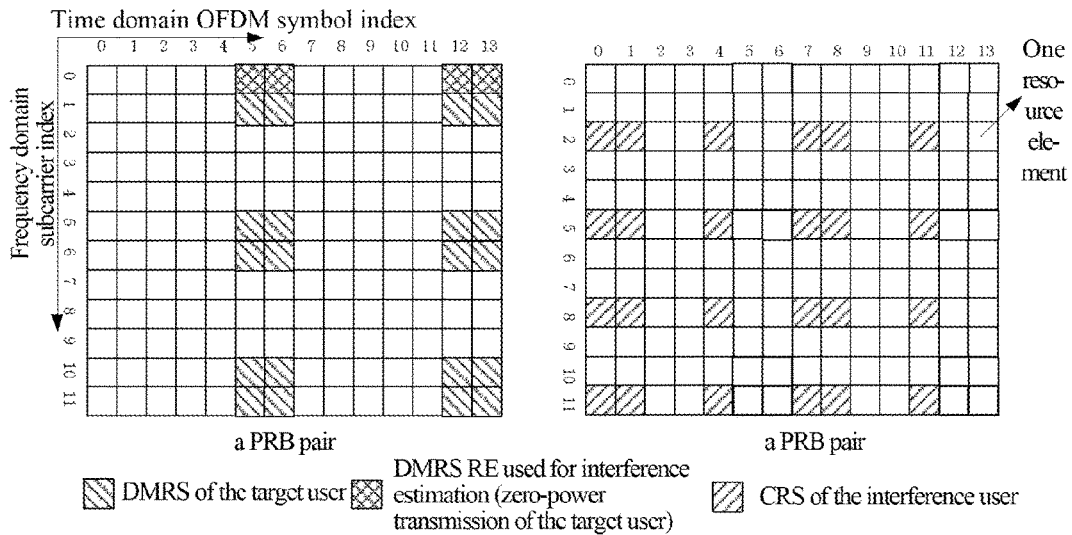
FIG. 5B is a schematic diagram of a configuration mode of performing interference measurement based on locations of specified REs in the embodiment of the present document.

In Way 2, the specified REs are part of resource element REs in the locations where the DMRS ports are located (including DMRS ports for the target user to transmit data or the rest ports except the DMRS ports for the target user to transmit data, which is not limited here). For example, as shown in FIG. 5B, the network side transmits a zero-power signal to the target user on part of REs in the locations of DMRS ports 7/8, and does not know or does not use pilot-related parameter information used in identical locations during the interference signal transmission. The target user directly measures to obtain the interference information through the signal received on the specified REs.

(4) The "power subtraction" interference measurement mode is to measure interference by means of subtracting useful signals from a total received signal, that is, $\tilde{r}(k,l)=r(k,l)-\bar{H}_s(k,l)d_s(k,l)$, or by means of subtracting received powers of the useful signals from a total received signal power.

Wherein, preferably, when the terminal has known related parameter information of interference signal transmission in locations of REs used for interference measurement, and the signal transmitted by the terminal in the locations of REs used for interference measurement and the signal transmitted in identical locations during the interference signal transmission satisfy an orthogonal relationship, the network side indicates the terminal to perform interference measurement through the orthogonal DMRS ports through the interference measurement indication information; and when the terminal does not know related parameter information of interference signal transmission in the locations of REs used for interference measurement, or the terminal has known the related parameter information of interference signal transmission in the locations of REs used for interference measurement, the network side indicates the terminal to directly perform interference measurement through the specified resource element REs.

The parameter configuration information used for interference measurement at least includes one or more kinds of DMRS initialization parameters used for interference measurement and DMRS ports used for interference measurement, wherein, when the DMRS ports used for interference measurement are configured, the DMRS initialization parameters used for interference measurement are configured for each port independently. The DMRS initialization parameters used for interference measurement include at least one of a scramble code ID related to a DMRS sequence used for interference measurement, a cell ID related to a DMRS sequence used for interference measurement, and a subframe/time slot/physical resource block PRB where a DMRS used for interference measurement is located.

Preferably, the network side sends the interference measurement indication information to the target user in one of the following ways.

In Way 1, The network side notifies interference measurement modes through M-bit physical layer dynamic signaling, wherein the interference measurement modes are at least one of the following modes:

performing interference measurement through orthogonal DMRS ports;

performing interference measurement through pseudo-orthogonal DMRS ports;

performing measurement through specified REs, wherein the specified REs are preferably configured in an implicit way; and a "power subtraction" interference measurement mode.

Wherein, when the interference measurement indication information received by the terminal indicates to perform interference measurement through the orthogonal DMRS ports, the terminal defaults that the DMRS ports used for interference measurement and the DMRS ports used for transmitting the data of the terminal occupy identical resource locations, and performs interference measurement based on identical DMRS initialization parameters.

When the interference measurement indication information received by the terminal indicates to perform interference measurement through the pseudo-orthogonal DMRS ports, the terminal defaults that the DMRS ports used for interference measurement and the DMRS ports used for transmitting the data of the terminal occupy identical resource locations, and performs interference measurement based on different DMRS initialization parameters.

When the interference measurement indication information received by the terminal indicates to perform interference measurement through the specified REs, the terminal defaults that locations of REs occupied by the DMRS ports used for interference measurement and locations of REs occupied by the DMRS ports used for transmitting the data of the terminal are different, and the terminal defaults that the network side transmits a zero-power signal on DMRS REs used for interference measurement, wherein transmitting the zero-power signal can be implemented by means of rate matching or punching.

Preferably, M is equal to 1 or 2.

In Way 2, the network side configures N sets of DMRS initialization parameters used for interference measurement through the top layer, and indicates to use one of the N sets of parameters for the current channel measurement through the physical layer dynamic signaling. Alternatively, one of the N sets of DMRS initialization parameters used for interference measurement is for unenhanced interference measurement, or besides indicating the N sets of parameters through the physical layer dynamic signaling, the network side indicates the target user to perform interference measurement in an unenhanced way through an additional state or signaling. The unenhanced way is used for representing the "power subtraction" interference measurement mode.

Wherein, preferably, after receiving the indication information of the DMRS initialization parameters used for interference measurement, when confirming that the indicated DMRS initialization parameters used for interference measurement and the DMRS initialization parameters used for the terminal transmitting the data are identical, the terminal performs interference measurement through the orthogonal DMRS ports; and when confirming that the indicated DMRS initialization parameters used for interference measurement and the DMRS initialization parameters used for the terminal transmitting the data are different, performs interference measurement through the pseudo-orthogonal DMRS ports.

In Way 3, the network side configures N sets of DMRS ports used for interference measurement through the top layer, and indicates to use one of the N sets of parameters for the current interference measurement through the physical layer dynamic signaling. Alternatively, one of the N sets of DMRS port configurations used for interference measurement is DMRS port configurations for unenhanced interference measurement, or besides indicating the N sets of parameters through the physical layer dynamic signaling, the network side indicates the target user to perform interference measurement in an unenhanced way through an additional state or signaling. The unenhanced way is used for representing the "power subtraction" interference measurement mode. Preferably, the terminal defaults that the network side configures identical DMRS initialization parameters for the target user and the interference user, and the terminal performs interference measurement according to the DMRS initialization parameters identical with those of the target user.

Wherein, preferably, after receiving the indication information of the DMRS ports used for interference measurement, when the DMRS ports used for interference measurement and the DMRS ports used for transmitting the data of the terminal are orthogonal, the terminal performs interference measurement according to the DMRS initialization parameters identical with those of the DMRS ports used for transmitting the data of the terminal; and when the DMRS ports used for interference measurement and the DMRS ports used for transmitting the data of the terminal are identical, performs interference measurement by means of averaging interference channel measurement results within the PRBs. Wherein, preferably, when confirming that the corresponding REs in the time-frequency domain of the DMRS ports used for interference measurement and the corresponding REs in the time-frequency domain of the DMRS ports used for transmitting the data of the terminal are orthogonal, the terminal extracts data according to rate matching rules of data mapping on REs corresponding to the DMRS ports used for interference measurement.

In Way 4, the network side configures N sets of DMRS ports used for interference measurement and initialization parameters corresponding to the ports through the top layer, and indicates to use one of the N sets of DMRS ports and initialization parameters of the ports through the physical layer dynamic signaling. Preferably, one of the N sets of DMRS ports used for interference measurement and initialization parameters corresponding to the ports is for unenhanced interference measurement, or besides indicating the N sets of parameters through the physical layer dynamic signaling, the network side indicates the target user to perform interference measurement in an unenhanced way through an additional state or signaling. The unenhanced way is used for representing the "power subtraction" interference measurement mode or traditional interference measurement mode.

Meanwhile, when locations of DMRS REs corresponding to the indicated DMRS ports used for interference measurement and locations of DMRS REs corresponding to the ports used for interference measurement are identical (DMRS port numbers are given, and locations of DMRS REs corresponding to the DMRS port numbers are fixed), and the initialization parameters are identical, or locations of DMRS REs corresponding to the indicated DMRS ports used for interference measurement and locations of DMRS REs corresponding to the ports used for interference measurement are different, and the network side transmits a zero-power signal in locations of REs occupied by the DMRS ports used for interference measurement, preferably the terminal performs interference measurement based on the orthogonal DMRS ports, otherwise the terminal performs interference measurement based on the pseudo-orthogonal DMRS port mode or "power subtraction" interference measurement mode, or when the system defaults that it is to transmit the zero-power signal to the target user in locations of REs occupied by the configured DMRS ports used for interference measurement, the target user also can directly perform interference measurement through the REs corresponding to the configured DMRS ports. Wherein, as a preferable way, it can be appointed that the network side transmits the zero-power signal to the target user in locations of the REs occupied by the configured DMRS ports used for interference measurement or locations of part of REs occupied by the DMRS ports.

Wherein, preferably, after receiving the DMRS ports used for interference measurement and corresponding initialization parameters, when the terminal confirms that the corresponding REs in the time-frequency domain of the DMRS ports used for interference measurement and the corresponding REs in the time-frequency domain of the DMRS ports used for transmitting the data of the terminal are overlapped and the DMRS initialization parameters corresponding to the DMRS ports used for interference measurement are identical, the terminal performs interference measurement through the orthogonal DMRS ports; otherwise, it performs interference measurement by means of averaging interference channel measurement results within the PRBs. Wherein, preferably, when the terminal confirms that the corresponding REs in the time-frequency domain of the DMRS ports used for interference measurement and the corresponding REs in the time-frequency domain of the DMRS ports used for transmitting the data of the terminal are orthogonal, it extracts data according to rate matching rules of data mapping at the REs corresponding to the DMRS ports used for interference measurement.

In Way 5, the network side configures N sets of DMRS ports used for interference measurement and interference measurement modes corresponding to the ports through the top layer, and indicates to use one of the N sets of DMRS ports and interference measurement modes corresponding to the ports through the physical layer dynamic signaling. Wherein, the interference measurement modes at least include performing interference measurement through the orthogonal DMRS ports, performing interference measurement through the pseudo-orthogonal DMRS ports, performing interference measurement through the specified REs and performing interference measurement through "power subtraction". Preferably, one of the N sets of DMRS ports used for interference measurement and interference measurement modes corresponding to the ports is for unenhanced interference measurement, or besides indicating the N sets of DMRS ports used for interference measurement and interference measurement modes corresponding to the ports through the physical layer dynamic signaling, the network side indicates the target user to perform interference measurement in an unenhanced way through an additional state or signaling. The unenhanced way is used for representing the "power subtraction" interference measurement mode.

Preferably, when the interference measurement mode received by the ports is indicating to perform interference measurement through the orthogonal DMRS ports or pseudo-orthogonal DMRS ports, the terminal defaults that a DMRS reference signal sequence used by the DMRS ports used for interference measurement during the interference signal transmission and a reference signal sequence used by the DMRS ports of the target user are identical, and when the interference is measured based on the orthogonal DMRS ports, if locations of REs occupied by the DMRS ports used for interference measurement and locations of REs occupied by the DMRS ports used for transmitting data of the terminal are different, the terminal defaults that the network side performs resource muting on DMRS REs corresponding to the DMRS ports used for interference measurement (that is, the network sides sends a zero-power signal to the target user in the DMRS REs). The terminal does not expect that the DMRS ports used for interference measurement and the DMRS ports used for transmitting data of the terminal are identical, and the indicated interference measurement mode is to measure interference by means of orthogonal DMRS ports.

In Way 6, the network side configures N sets of DMRS ports used for interference measurement, interference measurement modes corresponding to the ports and initialization parameter information corresponding to the ports through the top layer, and indicates to use one of the N sets of DMRS ports, interference measurement modes corresponding to the ports and initialization parameter information corresponding to the ports through the physical layer dynamic signaling. Preferably, one of the N sets of DMRS ports used for interference measurement, interference measurement modes corresponding to the ports and initialization parameter information corresponding to the ports is for unenhanced interference measurement, or besides indicating the N sets of DMRS ports, interference measurement modes corresponding to the ports and initialization parameter information corresponding to the ports through the physical layer dynamic signaling, the network side indicates the target user to perform interference measurement in an unenhanced way through an additional state or signaling. The unenhanced way is used for representing the "power subtraction" interference measurement mode.

Wherein, when the indication information of the interference measurement method received by the terminal indicates to perform interference measurement based on the orthogonal DMRS ports, if REs occupied by the indicated DMRS ports used for interference measurement and REs occupied by the DMRS ports used for transmitting data of the terminal are identical, the UE defaults that reference signal initialization parameters corresponding to the DMRS ports used for interference measurement and reference signal initialization parameters used by the DMRS ports used for transmitting data of the terminal are identical.

If the locations of REs occupied by the DMRS ports used for interference measurement and the locations of REs occupied by the DMRS ports used for transmitting data of the terminal are different, the terminal defaults that the network side performs muting on the DMRS REs corresponding to the DMRS ports used for interference measurement during the control/service data transmission of the target user. The terminal does not expect that the DMRS ports used for interference measurement and the DMRS ports used for transmitting data of the terminal are identical, and the configured reference signal initialization parameters are identical.

In the step 802, the target user performs interference measurement according to the received interference measurement information, and performs demodulation to obtain its own data (PDSCH/ePDCCH) based on the MMSE/MMSE-IRC receiver or advanced receivers by using the measured interference. Preferably, the target user assumes that an orthogonal mask length of the DMRS used for interference measurement is fixedly equal to 4 or 8 or the orthogonal mask length is determined through the received physical layer dynamic signaling.

The technical scheme in the embodiments of the present invention will be described clearly and completely in combination with the accompanying drawings in the embodiments of the present invention below. Apparently, the described embodiments are just a part of embodiments of the present invention but not all the embodiments, and different embodiments can be combined.

Embodiment 1

The network side sends indication information of interference measurement modes to the target user through top layer signaling and/or physical layer dynamic signaling. Correspondingly, it includes that:

the network side sends the indication information of interference measurement modes to the target user through M-bit physical layer dynamic signaling, wherein the interference measurement modes include: performing interference measurement through orthogonal DMRS ports; performing interference measurement by means of pseudo-orthogonal DMRS ports; performing interference measurement through specified REs; a traditional reference signal interference measurement mode or performing interference measurement according to "power subtraction". Wherein the "power subtraction" interference measurement mode is to measure interference by means of subtracting useful signals from a total received signal, that is, $\tilde{r}(k,l)=r(k,l)-\overline{H}_s(k,l)d_s(k,l)$, or by means of subtracting received powers of the useful signals from a total received signal power.

For example, when M=1, the network side indicates to the target user that the its interference measurement mode is one of performing interference measurement through orthogonal DMRS ports and performing interference measurement according to "power subtraction", through the physical layer dynamic signaling, as shown in Table 1.

TABLE 1

| 0 | Performing interference measurement through orthogonal DMRS ports |
| 1 | Performing interference measurement according to "power subtraction" |

As shown in Table 1, after the target user receives the 1-bit physical layer dynamic signaling, if the signaling indicates as 0, the target user performs interference measurement through a DMRS port orthogonal to a DMRS port of the target user, for example, the target user transmits data through a DMRS port 7, and at this point, it will perform interference measurement based on a port 8 orthogonal to the DMRS port of the target user. Otherwise, the signaling indicates as 1, and the target user performs interference measurement through "power subtraction".

When M=2, the network side indicates to the target user that its interference measurement mode is one of performing interference measurement through orthogonal DMRS ports or performing interference measurement by means of pseudo-orthogonal DMRS ports or performing interference measurement through specified REs or performing interference measurement according to "power subtraction", through the physical layer dynamic signaling, as shown in Table 2.

TABLE 2

| 00 | Performing interference measurement through orthogonal ports |
| 01 | Performing interference measurement by means of pseudo-orthogonality |
| 10 | Performing interference measurement through specified REs |
| 11 | Performing interference measurement according to "power subtraction" |

As shown in Table 2, after the target user receives the 2-bit physical layer dynamic signaling, if the signaling indicates as 00 and 01, processing modes are respectively the same as 0 and 1 in Table 1, otherwise, if the signaling indicates as 10, the target user performs interference measurement through DMRS resource element REs on which muting is performed in DMRS locations, for example, still with the target user transmitting data through the DMRS port 7 as an example, at this point, the network side can perform interference measurement by performing muting on resource element REs of the DMRS resource port 9 or 10 or by indicating the obtained DMRS resource element REs on which muting is performed in DMRS locations through other signalings. When the signaling indicates as 11, the target user performs interference measurement according to "power subtraction", the unenhanced way mentioned here is used for representing the "power subtraction" interference measurement mode or traditional interference measurement mode.

The interference measurement mode for the ePDCCH channel is similar to the above description, and it is only required to replace the DMRS ports 7/8/9/10 in the above example with DMRS ports 107/108/109/110. The target user performs interference measurement according to the interference measurement mode received through the physical layer dynamic signaling, and performs demodulation to obtain its own PDSCH/ePDCCH based on the MMSE/MMSE-IRC receiver or advanced receivers by using the measured interference.

Embodiment 2

The network side sends parameter configuration information used for interference measurement to the target user through top layer signaling and/or physical layer dynamic signaling, the parameter configuration information for interference measurement is DMRS initialization parameters used for interference measurement. Correspondingly, it includes that:

the network side configures N sets of DMRS initialization parameters used for interference measurement through the top layer, and indicates the target user to use one of the N sets of parameters for the current interference measurement through the physical layer dynamic signaling. Wherein, the DMRS initialization parameters used for interference measurement are DMRS initialization parameters of the interference signal, including at least one of a scramble code ID related to a DMRS sequence used for interference measurement, a cell ID related to the DMRS sequence and a subframe/time slot/physical resource block PRB where a DMRS used for interference measurement is located.

When the configured DMRS initialization parameters used for interference measurement and the DMRS initialization parameters used for data transmission of the target user are identical, the UE performs interference measurement by means of orthogonal DMRS ports, otherwise it performs interference measurement through pseudo-orthogonal DMRS ports.

The target user performs interference measurement according to the DMRS initialization parameters used for interference measurement received through the physical layer dynamic signaling, and performs demodulation to obtain its own PDSCH/ePDCCH based on the MMSE/MMSE-IRC receiver or advanced receivers by using the measured interference.

Embodiment 3

The network side sends parameter configuration information used for interference measurement to the target user through top layer signaling and/or physical layer dynamic signaling, the parameter configuration information used for interference measurement is DMRS ports used for interference measurement and initialization parameter information corresponding to the ports, wherein the initialization parameters used for interference measurement are configured for each port independently. Correspondingly, it includes that:

the network side configures N sets of DMRS ports used for interference measurement and initialization parameters corresponding to the ports through the top layer, and indicates to use one of the N sets of parameters for the current interference measurement through the physical layer dynamic signaling. Wherein, the DMRS initialization parameters used for interference measurement are DMRS initialization parameters of the interference signal, including at least one of a scramble code ID related to a DMRS sequence used for interference measurement, a cell ID related to the DMRS sequence and a subframe/time slot/physical resource block PRB where a DMRS used for interference measurement is located. When the corresponding REs in the time-frequency domain of the indicated DMRS ports used for interference measurement and the corresponding REs in the time-frequency domain of the DMRS ports of the target user are orthogonal, the network side performs muting processing on the REs corresponding to the indicated DMRS ports, and performs rate matching of data mapping; and when the corresponding REs in the time-frequency domain of the indicated DMRS ports used for interference measurement and the corresponding REs in the time-frequency domain of the DMRS ports of the target user (DMRS ports used for transmitting data of the terminal) are overlapped, if reference signal initialization parameters corresponding to the DMRS ports used for interference measurement and reference signal initialization parameters corresponding to the DMRS ports of the target user are identical, interference measurement is performed based on the orthogonal DMRS ports, otherwise the interference is estimated by means of averaging interference channel measurement results within the PRBs.

The target user performs interference measurement according to the DMRS ports used for interference measurement and initialization parameters corresponding to the ports received through the physical layer dynamic signaling, and performs demodulation to obtain its own PDSCH/ePDCCH based on the MMSE/MMSE-IRC receiver or advanced receivers by using the estimated interference.

Embodiment 4

The network side sends parameter configuration information used for interference measurement to the target user through top layer signaling and/or physical layer dynamic signaling, the parameter configuration information for interference measurement is DMRS initialization parameters used for interference measurement. Correspondingly, it includes that:

the network side configures N sets of DMRS initialization parameters used for interference measurement through the top layer, and indicates to use one of the N sets of parameters for the current interference measurement through the physical layer dynamic signaling. Wherein, one of the N sets of DMRS initialization parameters used for interference measurement is used for representing unenhanced interference measurement, or besides indicating the N sets of parameters through the physical layer dynamic signaling, the network side indicates the target user to perform interference measurement in an unenhanced way through an additional state or signaling. The unenhanced way is used for representing the "power subtraction" interference measurement mode or traditional interference measurement mode. The DMRS initialization parameters used for interference measurement are DMRS initialization parameters of the interference signal, including at least one of a scramble code Identity (ID) related to a DMRS sequence used for interference estimation and interference measurement, a cell ID related to the DMRS sequence and a subframe/time slot/physical resource block PRB where a DMRS used for interference measurement is located.

When the configured DMRS initialization parameters used for interference measurement and the DMRS initialization parameters used for data transmission of the target user are identical, the UE performs interference measurement by means of orthogonal DMRS ports, otherwise it performs interference measurement through pseudo-orthogonal DMRS ports.

The target user performs interference measurement according to the DMRS initialization parameters used for interference measurement received through the physical layer dynamic signaling, and performs demodulation to obtain its own PDSCH/ePDCCH based on the MMSE/MMSE-IRC receiver or advanced receivers by using the estimated interference.

Embodiment 5

The network side sends parameter configuration information used for interference measurement to the target user through top layer signaling and/or physical layer dynamic signaling, the parameter configuration information for interference measurement is DMRS ports used for interference measurement and initialization parameters corresponding to the ports, wherein the initialization parameter information used for interference measurement is configured for each port independently. Correspondingly, it includes that:

the network side configures N sets of DMRS ports used for interference measurement and initialization parameters corresponding to the ports through the top layer, and indicates to use one of the N sets of parameters for the current interference measurement through the physical layer dynamic signaling. Wherein, one of the N sets of DMRS ports used for interference measurement and initialization parameters corresponding to the ports is used for representing unenhanced interference measurement, or besides indicating one of the N sets of parameters through the physical layer dynamic signaling, the network side indicates the target user to perform interference measurement in an unenhanced way through an additional state or signaling. Wherein, the unenhanced way is used for representing the "power subtraction" interference measurement mode or traditional interference measurement mode. The DMRS initialization parameters used for interference measurement are DMRS initialization parameters of the interference signal, including at least one of a scramble code ID related to a DMRS sequence used for interference estimation and interference measurement, a cell ID related to the DMRS sequence and a subframe/time slot/physical resource block PRB where a DMRS used for interference measurement is located. When the corresponding REs in the time-frequency domain of the indicated DMRS ports used for interference measurement and the corresponding REs in the time-frequency domain of the DMRS ports of the target user are orthogonal, the network side performs muting processing on the REs corresponding to the indicated DMRS ports, and performs rate matching of data mapping; and when the corresponding REs in the time-frequency domain of the indicated DMRS ports used for interference measurement and the corresponding REs in the time-frequency domain of the DMRS ports of the target user are overlapped, if reference signal initialization parameters corresponding to the DMRS ports used for interference measurement and reference signal initialization parameters corresponding to the DMRS ports of the target user are identical, interference measurement is performed based on the orthogonal DMRS ports, otherwise the interference is estimated by means of averaging interference channel estimation results within the PRBs.

The target user performs interference measurement according to the DMRS ports used for interference measurement and initialization parameters corresponding to the ports received through the physical layer dynamic signaling, and performs demodulation to obtain its own PDSCH/ePDCCH based on the MMSE/MMSE-IRC receiver or advanced receivers by using the estimated interference.

Embodiment 6

The network side preconfigures two sets of DMRS initialization parameters used for interference measurement (respectively corresponding to two DMRS sequences, hereinafter called as interference sequences) to the target user through top layer signaling, and dynamically indicates to the target user that one of the two DMRS interference sequences is the DMRS sequence used for the current interference measurement through 1 bit in a downlink control authorization signaling and/or uplink control authorization signaling in a physical downlink control channel/enhanced physical downlink control channel, for example,

TABLE 3

| 0 | Calculating interference based on interference sequence 0 |
| 1 | Calculating interference based on interference sequence 1 |

As shown in Table 3, the target user receives the above information, and when the 1 bit in the downlink control authorization signaling and/or uplink control authorization signaling in the physical downlink control channel/enhanced physical downlink control channel indicates as 0, the target user calculates interference based on an interference sequence 0, otherwise it calculates interference based on an interference sequence 1.

The target user performs interference measurement according to the DMRS ports used for interference measurement and initialization parameters corresponding to the ports received through the physical layer dynamic signaling, and performs demodulation to obtain its own PDSCH/ePDCCH based on the MMSE/MMSE-IRC receiver or advanced receivers by using the estimated interference.

Embodiment 7

The network side preconfigures two sets of DMRS initialization parameters used for interference measurement (respectively corresponding to two DMRS sequences, hereinafter called as interference sequences) to the target user through top layer signaling, and dynamically indicates to the target user that which ones of the two DMRS interference sequences are the current interference sequences through 2 bits in a downlink control authorization signaling and/or uplink control authorization signaling in a physical downlink control channel/enhanced physical downlink control channel, for example,

TABLE 4

| 00 | Unenhanced way |
| 01 | Calculating interference based on interference sequence 0 |
| 10 | Calculating interference based on interference sequence 1 |
| 11 | Calculating interference based on interference sequences 0 and 1 |

As shown in Table 4, the target user receives the above information, when the 1 bit in the downlink control authorization signaling and/or uplink control authorization signaling in the physical downlink control channel/enhanced physical downlink control channel indicates as 00, the target user estimates interference according to the interference measurement mode in earlier versions of the system; when the 1 bit in the downlink control authorization signaling and/or uplink control authorization signaling in the physical downlink control channel/enhanced physical downlink control channel indicates as 01, the target user estimates interference based on the interference sequence 0; when the 1 bit in the downlink control authorization signaling and/or uplink control authorization signaling in the physical downlink control channel/enhanced physical downlink control channel indicates as 10, the target user estimates interference based on the interference sequence 1; and when the 1 bit in the downlink control authorization signaling and/or uplink control authorization signaling in the physical downlink control channel/enhanced physical downlink control channel indicates as 11, the target user carries out interference cancellation works two times based on the interference sequence 0 and interference sequence 1.

The target user performs interference measurement according to the DMRS ports used for interference measurement and initialization parameters corresponding to the ports received through the physical layer dynamic signaling, and performs demodulation to obtain its own PDSCH/ePDCCH based on the MMSE/MMSE-IRC receiver or advanced receivers by using the estimated interference.

Embodiment 8

The network side sends parameter configuration information used for interference measurement to the target user through top layer signaling and/or physical layer dynamic signaling, the parameter configuration information for interference measurement is DMRS ports used for interference measurement. Correspondingly, it includes that:

the network side configures N sets of DMRS ports used for interference measurement through the top layer, and indicates the target user to use one of the N sets of DMRS ports for the current interference measurement through the physical layer dynamic signaling.

The target user performs interference measurement according to the DMRS ports used for interference measurement received through the physical layer dynamic signaling, and performs demodulation to obtain its own PDSCH/ePDCCH based on the MMSE/MMSE-IRC receiver or advanced receivers by using the estimated interference. Wherein, when the DMRS ports used for interference measurement indicated by the network side and received by the target user are orthogonal to the DMRS ports of the target user itself, the target user defaults to perform interference measurement according to the DMRS initialization parameters identical with the DMRS initialization parameters of the target user itself; otherwise, when the received DMRS ports used for interference measurement indicated by the network side are identical with the DMRS ports of the target user itself, the target user will estimate interference by means of averaging interference channel estimation results within the PRBs.

Embodiment 9

The network side sends parameter configuration information used for interference measurement to the target user through top layer signaling and/or physical layer dynamic signaling, the parameter configuration information for interference measurement is DMRS ports used for interference measurement. Correspondingly, it includes that:

the network side configures N sets of DMRS ports used for interference measurement through the top layer, and indicates the target user to use one of the N sets of DMRS ports for the current interference measurement through the physical layer dynamic signaling. Wherein, when the indicated DMRS ports used for interference measurement are orthogonal to the DMRS ports of the target user, the network side configures identical DMRS initialization parameters for the target user and the interference user; and when the indicated DMRS ports used for interference measurement are identical with the DMRS ports of the target user, the network side configures different DMRS initialization parameters for the target user and the interference user.

The target user performs interference measurement according to the DMRS ports used for interference measurement received through the physical layer dynamic signaling, and performs demodulation to obtain its own PDSCH/ePDCCH based on the MMSE/MMSE-IRC receiver or advanced receivers by using the estimated interference. Wherein, when the DMRS ports used for interference measurement indicated by the network side and received by the target user are orthogonal to the DMRS ports of the target user itself, the user performs interference measurement according to the DMRS initialization parameters identical with the DMRS initialization parameters of the target user itself; otherwise, when the received DMRS ports used for interference measurement indicated by the network side are identical with the DMRS ports of the target user itself, the target user will estimate interference by means of averaging interference channel estimation results within the PRBs.

Embodiment 10

The network side sends parameter configuration information used for interference measurement and interference measurement modes to the target user through top layer signaling and/or physical layer dynamic signaling, wherein the parameter configuration information for interference measurement is DMRS ports for interference measurement, the interference measurement mode information includes: performing interference measurement through orthogonal DMRS ports; performing interference measurement by means of pseudo-orthogonal DMRS ports; performing interference measurement through specified REs; a traditional reference signal interference measurement mode or performing interference measurement according to "power subtraction". Correspondingly, the network side configures N sets of DMRS ports used for interference measurement and interference measurement modes corresponding to the ports through the top layer, and indicates the target user to use one of the N sets of DMRS ports and interference measurement modes for the current interference measurement through the physical layer dynamic signaling. Wherein, when the interference information (interference user) of the target user is transmitted based on a CRS, the network side configures DMRS ports orthogonal to DMRS port resources of the target user for the target user and performs interference measurement by means of estimating interference information through DMRS resource element REs on which resource muting is performed in the port locations. Correspondingly, it is assumed that the target user has two interference users, wherein the interference user 1 transmits its data/control information based on a DMRS port 8, the interference user 2 transmits its data/control information based on a CRS, and the target user transmits its data/control information based on a DMRS port 7. At this point, the network side will configure the DMRS port 8 and port 9/10 to the target user for the interference measurement, and an interference measurement mode of the port 8 is to perform interference measurement through orthogonal ports, and an interference measurement mode of the port 9/10 is to perform interference measurement through specified REs.

After the target user receives the DMRS ports used for interference measurement and interference measurement modes corresponding to the ports indicated by the top layer/physical layer dynamic signaling, as shown in the above embodiment, the target user estimates interference of the interference user 1 through the DMRS port 8 and DMRS initialization parameters identical with those of the port 8 according to the indication, and estimates interference of the interference user 2 through the DMRS resource element REs on which resource muting is performed in location of the DMRS port 9/10. And the target user performs demodulation to obtain its own PDSCH/ePDCCH based on the MMSE/MMSE-IRC receiver or advanced receivers by using the estimated interference. Wherein, when interference measurement is performed through the DMRS port 8, the DMRS initialization parameters of the port 8 also can be obtained by receiving the indication of the top layer/physical layer dynamic signaling of the network side.

Embodiment 11

The network side indicates the target user to perform interference measurement through orthogonal DMRS ports through top layer signaling and/or physical layer dynamic signaling. Correspondingly, it includes that:

as shown in FIG. 3A, DMRS ports "" of the target user and DMRS ports "" of the interference signal occupy identical RE resource locations, and possess identical DMRS initialization parameters (including a scramble code ID related to a DMRS sequence used for interference estimation and interference measurement and/or a cell ID related to a DMRS sequence and/or a subframe/time slot/physical resource block PRB where a DMRS used for interference measurement is located and so on), wherein, the DMRS ports of the target user and the DMRS ports of the interference user are in code division orthogonality, for example, the target user uses an orthogonal mask [1 1] in each pair of DMRS REs, and the interference user uses an orthogonal mask [1 −1] in each pair of DMRS REs .

Correspondingly, it includes that: the target user transmits its data information (PDSCH) based on a DMRS port 7, estimates interference information thereof through a port 8, and assumes that DMRS sequence initialization information of the port 8 and DMRS sequence initialization information of the port 7 are identical or the target user can obtain DMRS sequence initialization information of the interference signal in location of the port 8. The target user estimates interference equivalent channel information of the PDSCH of the target user through the port 8.

Or, the target user transmits its control information (ePDCCH) based on a DMRS port 107, estimates interference information thereof through a port 108, and assumes that DMRS sequence initialization information of the port 108 and DMRS sequence initialization information of the port 107 are identical or the target user can obtain DMRS sequence initialization information of the interference signal in location of the port 108. The target user estimates interference equivalent channel information of the ePDCCH of the target user through the port 108.

Based on the obtained interference equivalent channel information, the target user performs demodulation to obtain its own PDSCH/ePDCCH based on the MMSE/MMSE-IRC receiver or advanced receivers.

Embodiment 12

The network side indicates the target user to perform interference measurement through orthogonal DMRS ports through top layer signaling and/or physical layer dynamic signaling. Correspondingly, it includes that:

as shown in FIG. 3B, DMRS ports "" of the target user and DMRS ports "" of the interference signal occupy different RE resource locations (that is, time-frequency resource locations of the DMRS ports of the target user and time-frequency resource locations of the DMRS ports of the interference signal are orthogonal), the network side performs muting processing on the target user in locations of DMRS REs "" used by the interference signal, that is, sending a zero-power signal to the target user, wherein the data/control signal of the target user can avoid these DMRS REs by means of rate matching or punching during the resource mapping.

Correspondingly, it includes that: the target user transmits its data information (PDSCH) based on a DMRS port 9, estimates interference information thereof through a port 7, and assumes that DMRS sequence initialization information of the port 7 and DMRS sequence initialization information of the port 9 are identical or the target user can have known DMRS sequence initialization information of the interference signal in location corresponding to the port 7. And the network side performs muting processing on the target user in the RE location of the port 7, that is, a zero-power DMRS signal is sent to the target user through the port 7, and the PDSCH is processed by means of rate matching or punching at the RE location corresponding to the port 7. The target user estimates interference equivalent channel information of the PDSCH of the target user through the port 7.

Or, the target user transmits its control channel information (ePDCCH) based on a DMRS port 109, estimates interference information thereof through a port 107, and assumes that DMRS sequence initialization information of the port 107 and DMRS sequence initialization information of the port 109 are identical or the target user can have known DMRS sequence initialization information of the interference signal in location corresponding to the port 109. And the target user performs muting processing in the RE location of the port 107, that is, the target user sends a zero-power DMRS signal through the port 107, and the ePDCCH is processed by means of rate matching or punching at the RE location corresponding to the port 107, preferably, the ePDCCH is processed by means of rate matching. The target user estimates interference equivalent channel information of the PDSCH of the target user through the port 107.

Based on the estimated equivalent channel information of the interference signal, the target user performs demodulation to obtain its own PDSCH/ePDCCH based on the MMSE/MMSE-IRC receiver or advanced receivers.

Embodiment 13

The network side indicates the target user to perform interference measurement through orthogonal DMRS ports through top layer signaling and/or physical layer dynamic signaling. Correspondingly, it includes that:

as shown in FIG. 3A, DMRS ports "  " of the target user and DMRS ports "  " of the interference signal occupy identical RE resource locations, but possess different DMRS initialization parameters (a scramble code ID related to a DMRS sequence used for interference estimation and interference measurement and/or a cell ID related to a DMRS sequence and/or a subframe/time slot/physical resource block PRB where a DMRS used for interference measurement is located and so on).

Correspondingly, it includes that: the target user transmits its data information (PDSCH) based on a DMRS port 7, the interference signal transmits its data (PDSCH)/control channel information (ePDCCH) based on a DMRS port 8/108, and the DMRS initialization parameters of the port 8/108 of the interference signal is different from the DMRS initialization parameters of the port 7 of the target user. At this point, the target user is required to have known DMRS initialization parameter information of the port 8/108 of the interference signal, and based on the information and by estimating interference channel coefficients in locations of DMRS REs of the interference signal and performing averaging processing, roughly obtains equivalent channel information of the interference sources.

Or, the target user transmits its control channel information (ePDCCH) based on a DMRS port 107, the interference signal transmits its data (PDSCH)/control channel information (ePDCCH) based on a DMRS port 8/108, and the DMRS initialization parameters of the port 8/108 of the interference signal are different from the DMRS initialization parameters of the port 107 of the target user. At this point, the target user is required to have known DMRS initialization parameter information of the port 8/108 of the interference signal, and based on the information and by estimating interference channel coefficients in locations of DMRS REs of the interference signal and performing averaging processing, roughly obtains equivalent channel information of the interference sources.

Based on the obtained interference equivalent channel information, the target user performs demodulation to obtain its own PDSCH/ePDCCH based on the MMSE/MMSE-IRC receiver or advanced receivers.

Embodiment 14

The network side indicates the target user to perform interference measurement by means of pseudo-orthogonal DMRS ports through top layer signaling and/or physical layer dynamic signaling. Correspondingly, it includes that:

as shown in FIG. 4, DMRS ports "  " of the target user and DMRS ports "  " of the interference signal occupy different RE resource locations (that is, time-frequency resource locations of the DMRS ports of the target user and time-frequency resource locations of the DMRS ports of the interference signal are orthogonal), but the target user still transmits a non-zero-power signal in locations of REs corresponding to the DMRS ports of the interference signal (that is, muting processing is not performed).

Correspondingly, it includes that: the target user transmits its data information (PDSCH) based on a DMRS port 9/10, and sends data/control channel information in location of a DMRS port 7/8/107/108 of the target user, the target user estimates interference channel coefficients in locations of DMRS REs of the port 7/8/107/108 of the target user through DMRS initialization information of a port 7/8/107/108 of the interference signal and performing averaging, and roughly obtains equivalent channel information of the interference sources.

Or, the target user transmits its control channel information (ePDCCH) based on a DMRS port 109/110, and sends data/control channel information in location of a DMRS port 7/8/107/108 of the target user, the target user estimates interference channel coefficients in locations of DMRS REs of the port 7/8/107/108 of the target user through DMRS initialization information of a port 7/8/107/108 of the interference signal and performs averaging, and roughly obtains equivalent channel information of the interference sources.

Based on the measured equivalent channel information of the interference signal, the target user performs demodulation to obtain its own PDSCH/ePDCCH based on the MMSE/MMSE-IRC receiver or advanced receivers.

Embodiment 15

The network side indicates the target user to perform interference measurement through specified REs through top layer signaling and/or physical layer dynamic signaling. Correspondingly, it includes that:

as shown in FIG. 5A, the target user transmits its data/control channel information based on DMRS REs "  ", and the interference signal transmits its data/control channel information based on CRS REs "  ". The target user measures interference information based on DMRS REs "  ", and performs resource muting processing (zero-power transmission) on DMRS REs corresponding to the DMRS REs "  ", wherein the data/control channel signal of the target user is to avoid these RE locations by means of rate matching or punching. Meanwhile, the target user does not know related information of the interference signal in the locations of DMRS REs "  " The target user receives the interference signal based on the DMRS REs "  ", and measures interference power information.

Correspondingly, it includes that: the target user transmits its data/control channel information based on a DMRS port 9/10/109/110, measuring interference information based on a DMRS port 7/8/107/108, and performs resource muting processing (zero-power transmission) in DMRS REs corresponding to the DMRS port 7/8/107/108, wherein the data/control channel signal of the target user is to avoid these RE locations by means of rate matching or punching. When the target user has known related information of the interference signal at the DMRS port 7/8/107/108, the target user can obtain interference channel matrix information through the related information and muting processing on the DMRS REs in these specified locations; and when the target user does not know the related information of the interference signal at the DMRS port 7/8/107/108, the target user can obtain interference power information by receiving the interference signal on DMRS REs on which muting processing is performed in these specified locations.

Based on the measured interference information, the target user performs demodulation to obtain its own PDSCH/ePDCCH based on the MMSE/MMSE-IRC receiver or advanced receivers.

Embodiment 16

The network side indicates the target user to perform interference measurement through specified REs through top layer signaling and/or physical layer dynamic signaling. Correspondingly, it includes that:

as shown in FIG. 5B, the network side transmits data/control channel information to the target user based on DMRS REs "▦", and transmits data/control channel information to the interference user based on CRS REs "▦". The target user measures interference information based on DMRS REs "▦", and the network side performs resource muting processing on the target user (that is, sending a zero-power useful signal to the target user) on DMRS REs corresponding to the DMRS REs "▦", wherein the data/control channel signal of the target user is to avoid these RE locations by means of rate matching or punching. Meanwhile, the target user does not know related information of the interference signal in the locations of DMRS REs "▦". The target user receives the interference signal based on the DMRS REs "▦", and measures interference power information.

Correspondingly, it includes that: the target user transmits its data/control channel information based on DMRS ports 7~10/107~110, and measures interference information based on DMRS REs in specified locations at the DMRS port 7/8/107/108. Meanwhile, the target user performs resource muting processing (zero-power transmission) on DMRS REs corresponding to the DMRS port 7/8/107/108, and the data/control channel signal of the target user is to avoid these RE locations by means of rate matching or punching. When the target user has known related information of the interference signal in DMRS REs in specified locations at the DMRS port 7/8/107/108, the target user can obtain interference channel matrix information through the related information and muting processing on the DMRS REs in these specified locations; and when the target user does not know the related information of the interference signal in DMRS REs in specified locations at the DMRS port 7/8/107/108, the user can obtain interference power information by receiving the interference signal on DMRS REs on which muting processing is performed in these specified locations.

Based on the measured interference information, the target user performs demodulation to obtain its own PDSCH/ePDCCH based on the MMSE/MMSE-IRC receiver or advanced receivers.

Embodiment 17

The network side indicates the target user to perform interference measurement through specified REs through top layer signaling and/or physical layer dynamic signaling. Correspondingly, it includes that:

as shown in FIG. 3B, DMRS ports "▦" of the target user and DMRS ports "▦" of the interference signal occupy different RE resource locations, the network side performs muting processing on the target user in locations of DMRS REs "▦" used by the interference signal, that is, sending a zero-power signal to the target user. Meanwhile the data/control signal of the target user is to avoid these DMRS REs by means of rate matching or punching during the resource mapping. The target user does not know DMRS initialization parameter information of the interference signal. The target user receives the interference signal in locations of DMRS REs "▦", and measures interference power information.

Correspondingly, it includes that: the target user transmits its data information (PDSCH) based on a DMRS port 9, measures interference information thereof through a port 7, and assumes that the target user does not know initialization parameter information of the port 7 of the interference user. The network side performs muting processing on the target user in the RE location of the port 7, that is, a zero-power DMRS signal is sent to the target user through the port 7, and the PDSCH is processed by means of rate matching or punching at the RE location corresponding to the port 7. The target user measures interference power information undertaken by the PDSCH of the target user through the port 7.

Or, the target user transmits its control channel information (ePDCCH) based on a DMRS port 109, measures interference information thereof through a port 107, and assumes that the target user does not know initialization parameter information of the port 7 of the interference user. The network side performs muting processing on the target user in the RE location of the port 107, that is, a zero-power DMRS signal is sent to the target user through the port 107, and the ePDCCH is processed by means of rate matching or punching at the RE location corresponding to the port 107, and preferably the ePDCCH is processed by means of rate matching. The target user measures interference power information undertaken by the ePDCCH of the target user through the port 107.

Based on the measured equivalent channel information of the interference signal, the target user performs demodulation to obtain its own PDSCH/ePDCCH based on the MMSE/MMSE-IRC receiver or advanced receivers.

Embodiment 18

Figure 5C:
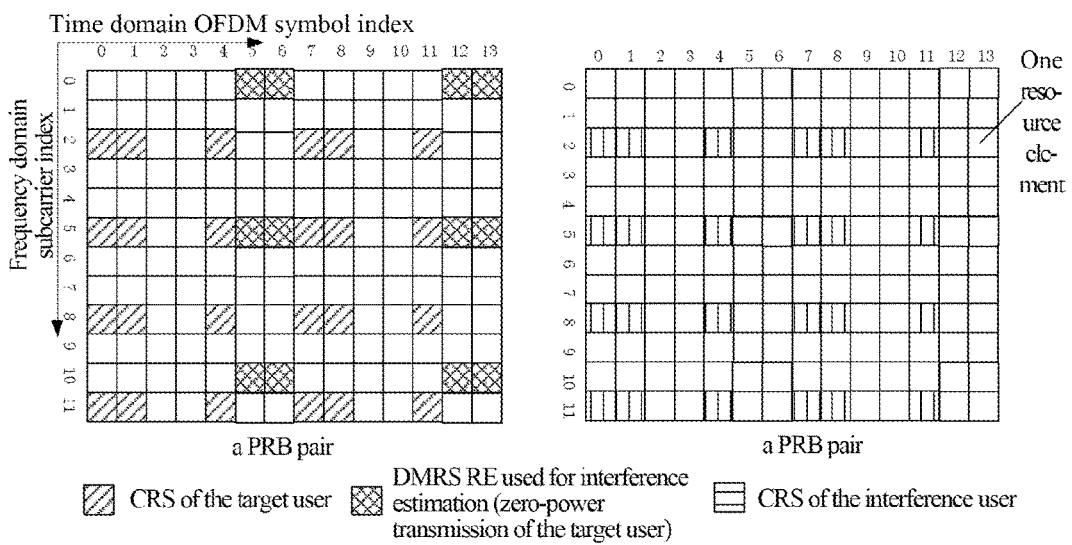
FIG. 5C is a schematic diagram of a configuration mode of performing interference measurement based on locations of specified REs in the embodiment of the present invention.

The network side indicates the target user to perform interference measurement through specified REs through top layer signaling and/or physical layer dynamic signaling. Correspondingly, it includes that:

as shown in FIG. 5C/5D/5E/5F, the target user transmits data based on CRS ports "▦", the network side indicates the target user to measure interference in locations of DMRS REs "▦", and the network side performs muting processing on the target user in locations of DMRS REs "▦" where the interference signal is located, that is, transmitting a zero-power signal to the target user in these REs. The target user measures interference by receiving the interference signal in these locations of DMRS REs "▦" in resource muting.

Figure 5D:
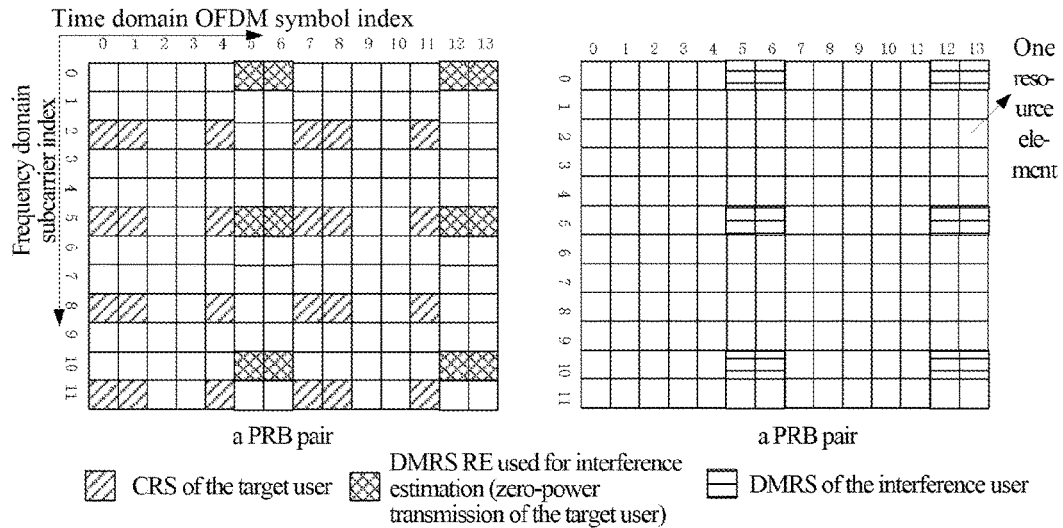
FIG. 5D is a schematic diagram of a configuration mode of performing interference measurement based on locations of specified REs in the embodiment of the present document.
Figure 5E:
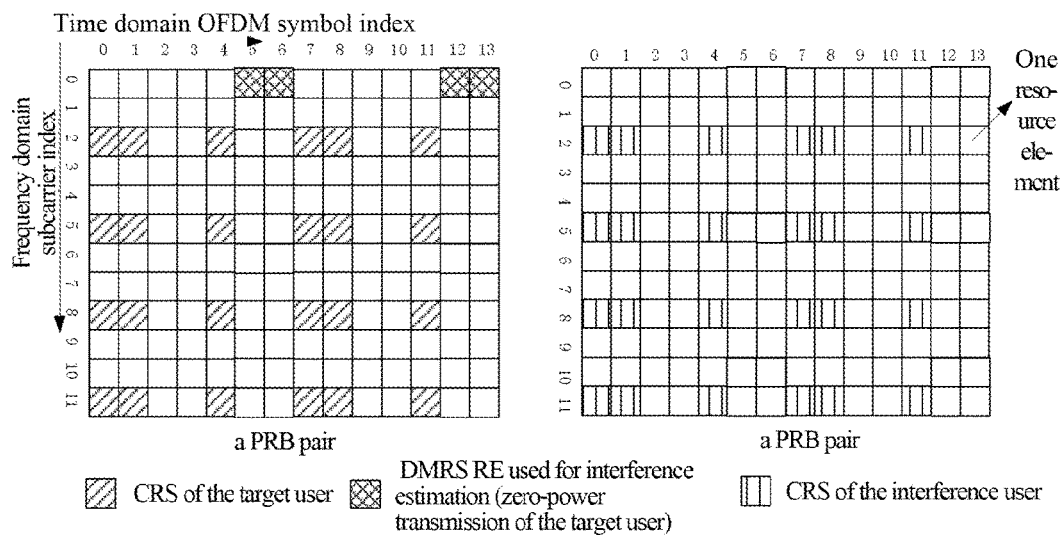
FIG. 5E is a schematic diagram of a configuration mode of performing interference measurement based on locations of specified REs in the embodiment of the present document.
Figure 5F:
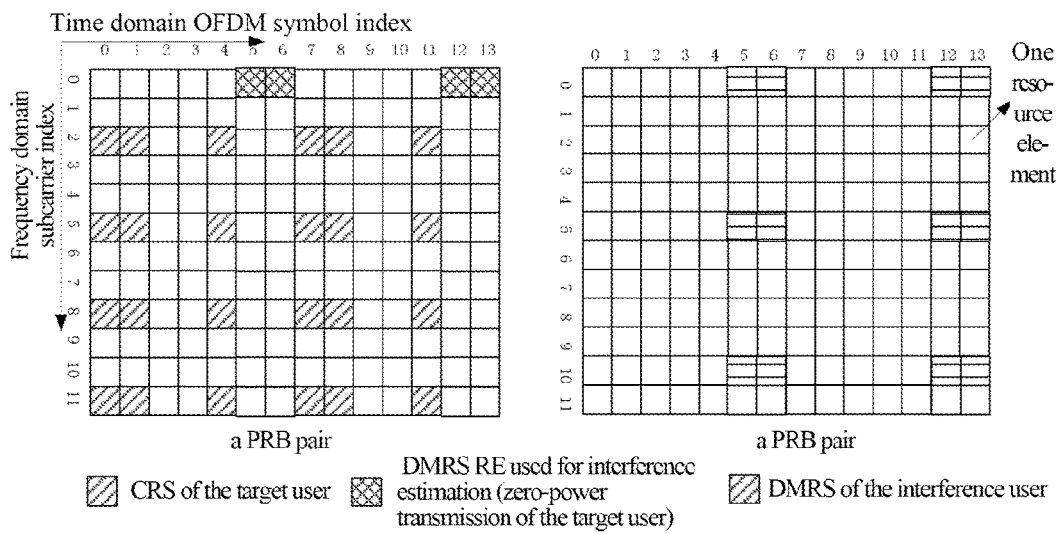
FIG. 5F is a schematic diagram of a configuration mode of performing interference measurement based on locations of specified REs in the embodiment of the present document.

When the interference user transmits data based on the DMRS (as shown in FIG. 5D or 5F), and the target user can have known DMRS initialization parameters of the interference user at the locations in resource muting, the target user can measure equivalent channel information of the interference signal through the interference signal received at the DMRS RE locations "▦" in resource muting and the known DMRS initialization parameter information of the interference user;

when the interference user transmits data based on the CRS (as shown in FIG. 5C or 5E), or the interference user transmits data based on the DMRS (as shown in FIG. 5D or 5F) but the target user cannot acquire the DMRS initialization parameters of the interference user, the target user directly measures interference signal power information through the interference signal received at the DMRS RE locations "▦" in resource muting.

Figure 6:
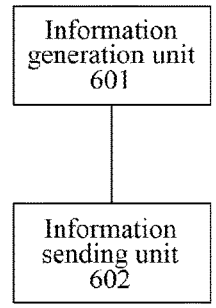
FIG. 6 is an architecture chart of a network side device according to the embodiment of the present document.

As shown in FIG. 6, the embodiment also provides a network side device, which includes: an information generation unit 601 and an information sending unit 602, wherein:

the information generation unit 601 is used to generate interference estimation indication information;

the information sending unit 602 is used to send interference measurement indication information to a terminal to indicate the terminal to perform interference measurement;

wherein, the interference measurement indication information is used for indicating one or more kinds of the following information to the terminal: (1) interference measurement modes used for performing interference measurement; (2) parameter configuration information used for interference measurement.

The interference measurement modes comprise one or more kinds of the following modes:

(1) performing interference measurement through orthogonal demodulation reference signal DMRS ports, wherein the mode is to perform interference measurement through DMRS ports orthogonal to DMRS ports used for transmitting data of the terminal;

(2) performing interference measurement through pseudo-orthogonal DMRS ports, wherein the mode is to perform interference measurement through DMRS ports pseudo-orthogonal to DMRS ports used for transmitting data of the terminal;

(3) performing interference measurement through specified resource element REs, wherein the mode is, by transmitting a zero-power signal to the terminal on the specified REs, the terminal performing interference measurement through a received signal on the specified REs;

(4) "power subtraction" interference measurement, wherein the mode is to perform interference measurement by subtracting useful signals from a total received signal or subtracting received powers of the useful signals from a total received signal power.

The parameter configuration information used for interference measurement comprises one or more kinds of the following information:

(1) DMRS initialization parameters used for interference measurement;

(2) DMRS ports used for interference measurement.

The DMRS initialization parameters used for interference measurement include: at least one of a scramble code identity related to a DMRS sequence used for interference measurement, a cell identity related to a DMRS sequence used for interference measurement and a subframe/time slot/physical resource block PRB in which a DMRS used for interference measurement is located; and the DMRS ports used for interference measurement include at least one of DMRS ports 7~14, or include at least one of DMRS ports 107~110.

When the parameter configuration information used for interference measurement simultaneously comprises the DMRS initialization parameters used for interference measurement and the DMRS ports used for interference measurement, the information generation unit configures the DMRS initialization parameters for each DMRS port independently.

Performing interference measurement through the DMRS ports orthogonal to the DMRS ports used for transmitting the data of the terminal includes:

the DMRS ports used for interference measurement and the DMRS ports used for transmitting the data of the terminal satisfying an orthogonal relationship, and the terminal having known related parameter information of interference signal transmission on the DMRS ports used for interference measurement.

Performing interference measurement through the orthogonal DMRS ports includes one or more kinds of the following ways:

In Way 1, Time-frequency resource locations of the DMRS ports used for interference measurement and time-frequency resource locations of the DMRS ports used for transmitting the data of the terminal are overlapped, and the terminal performs interference measurement by using initialization parameters identical with and orthogonal masks different from those of the DMRS ports used for transmitting the data of the terminal;

In Way 2, Time-frequency resource locations of the DMRS ports used for interference measurement and time-frequency resource locations of the DMRS ports used for transmitting the data of the terminal are different, and the terminal transmits a zero-power signal on the DMRS ports used for interference measurement, the terminal performs interference measurement through the DMRS initialization parameters and orthogonal masks of the DMRS ports used for interference measurement.

Performing interference measurement through the DMRS ports pseudo-orthogonal to the DMRS ports used for transmitting the data of the terminal includes:

the DMRS ports used for interference measurement and the DMRS ports used for transmitting the data of the terminal satisfying a pseudo-orthogonal relationship, and the terminal having known related parameter information of interference signal transmission on the DMRS ports used for interference measurement.

Performing interference measurement through the pseudo-orthogonal DMRS ports includes one or more kinds of the following ways:

In Way 1, Time-frequency resource locations of the DMRS ports used for interference measurement and time-frequency resource locations of the DMRS ports used for transmitting the data of the terminal are overlapped, and the terminal performs interference measurement by using DMRS initialization parameters different from and orthogonal masks different from those of the DMRS ports used for transmitting the data of the terminal;

In Way 2, Time-frequency resource locations of the DMRS ports used for interference measurement and time-frequency resource locations of the DMRS ports used for transmitting the data of the terminal are different, and the terminal transmits a non-zero-power signal on the DMRS ports used for interference measurement, the terminal performs interference measurement through the DMRS initialization parameters and orthogonal masks of the DMRS ports used for interference measurement.

Performing interference measurement through the specified REs includes one or more kinds of the following ways:

In Way 1, The specified REs are REs in locations where one or more DMRS ports, except DMRS ports used for transmitting data to the terminal, are located, the network side sends the zero-power signal to the terminal on the REs in locations where the one or more DMRS ports are located, and the terminal performs interference measurement through the received signal on the REs in locations where the DMRS ports are located;

In Way 2, The specified REs are part of REs in locations where the DMRS ports are located, the network side sends the zero-power signal to the terminal on the part of REs in locations where the DMRS ports are located, and the terminal performs interference measurement through the received signal on the part of REs in locations where the DMRS ports are located.

The information sending unit indicates a used interference measurement mode to the terminal through 1 bit or 2 bits in top layer signaling/physical layer dynamic signaling.

The information sending unit configures a plurality of sets of DMRS initialization parameters for the terminal through the top layer signaling, and indicates the terminal to use one of the plurality of sets of DMRS initialization parameters for the current interference measurement through the physical layer dynamic signaling;

the information sending unit configures a plurality of sets of DMRS ports for the terminal through the top layer signaling, and indicates the terminal to use one of the plurality of sets of DMRS ports for the current interference measurement through the physical layer dynamic signaling;

the information sending unit configures a plurality of sets of DMRS ports and DMRS initialization parameters corresponding to the ports for the terminal through the top layer signaling, and indicates the terminal to use one of the plurality of sets of DMRS ports and DMRS initialization parameters corresponding to the ports for the current interference measurement through the physical layer dynamic signaling;

the information sending unit configures a plurality of sets of DMRS ports and interference measurement modes corresponding to the ports for the terminal through the top layer signaling, and indicates the terminal to use one of the plurality of sets of DMRS ports and interference measurement modes corresponding to the ports for the current interference measurement through the physical layer dynamic signaling; and the information sending unit configures a plurality of sets of DMRS ports, interference measurement modes corresponding to the ports, and DMRS initialization parameters corresponding to the ports for the terminal through the top layer signaling, and indicates the terminal to use one of the plurality of sets of DMRS ports, interference measurement modes corresponding to the ports, and DMRS initialization parameters corresponding to the ports for the current interference measurement through the physical layer dynamic signaling.

There is a set of parameters in the plurality of sets of parameters configured by the information sending unit which is used for representing using the "power subtraction" interference measurement mode; or besides indicating which set of parameters in the plurality of sets of parameters is used for the current interference measurement through the physical layer dynamic signaling, it is to indicate to represent using the "power subtraction" interference measurement mode to perform interference measurement through an additional state or signaling.

When indicating the DMRS ports used for interference measurement to the terminal through the interference measurement indication information, and when the indicated DMRS ports used for interference measurement and the DMRS ports used for transmitting the data of the terminal are orthogonal on REs in a time-frequency domain, the information sending unit transmits the zero-power signal on REs of the indicated DMRS ports used for interference measurement, and performs data mapping by means of rate matching or punching.

The information sending unit makes the interference measurement indication information act on frequency domain bandwidth resources/physical resource block PRBs of downlink data service transmission corresponding to the terminal.

Figure 7:
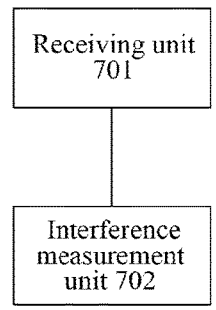
FIG. 7 is an architecture chart of a terminal device according to the embodiment of the present document.

As shown in FIG. 7, the embodiment also provides a terminal device, which includes: a receiving unit 701 and an interference measurement unit 702, wherein:

the receiving unit 701 is used to receive interference measurement indication information sent by a network side;

the interference measurement unit 702 is used to perform interference measurement according to an indication of the interference measurement indication information;

wherein, the interference measurement indication information is used for indicating one or more kinds of the following information: (1) interference measurement modes used for performing interference measurement; (2) parameter configuration information used for interference measurement.

The interference measurement modes comprise one or more kinds of the following modes:

(1) performing interference measurement through orthogonal demodulation reference signal DMRS ports, wherein the mode is to perform interference measurement through DMRS ports orthogonal to DMRS ports used for transmitting data of the terminal;

(2) performing interference measurement through pseudo-orthogonal DMRS ports, wherein the mode is to perform interference measurement through DMRS ports pseudo-orthogonal to DMRS ports used for transmitting data of the terminal;

(3) performing interference measurement through specified resource element REs, wherein the mode is to perform interference measurement by transmitting a zero-power signal to the terminal on the specified REs and directly through a received signal on the specified REs; and (4) "power subtraction" interference measurement, wherein the mode is to perform interference measurement by subtracting useful signals from a total received signal or subtracting received powers of the useful signals from a total received signal power.

The parameter configuration information used for interference measurement comprises one or more kinds of the following information:

(1) DMRS initialization parameters used for interference measurement; and (2) DMRS ports used for interference measurement.

Performing interference measurement through the DMRS ports orthogonal to the DMRS ports used for transmitting the data of the terminal includes:

the DMRS ports used for interference measurement and the DMRS ports used for transmitting the data of the terminal satisfying an orthogonal relationship, and the terminal having known related parameter information of interference signal transmission on the DMRS ports used for interference measurement.

Performing interference measurement through the orthogonal DMRS ports comprises one or more kinds of the following ways:

In Way 1, Time-frequency resource locations of the DMRS ports used for interference measurement and time-frequency resource locations of the DMRS ports used for transmitting the data of the terminal are overlapped, and the terminal performs interference measurement by using initialization parameters identical with and orthogonal masks different from those of the DMRS ports used for transmitting the data of the terminal;

In Way 2, Time-frequency resource locations of the DMRS ports used for interference measurement and time-frequency resource locations of the DMRS ports used for transmitting the data of the terminal are different, and the terminal transmits a zero-power signal on the DMRS ports used for interference measurement, the terminal performs interference measurement through the DMRS initialization parameters and orthogonal masks of the DMRS ports used for interference measurement.

Performing interference measurement through the DMRS ports pseudo-orthogonal to the DMRS ports used for transmitting the data of the terminal includes:

the DMRS ports used for interference measurement and the DMRS ports used for transmitting the data of the terminal satisfying a pseudo-orthogonal relationship, and the terminal having known related parameter information of interference signal transmission on the DMRS ports used for interference measurement.

Performing interference measurement through the pseudo-orthogonal DMRS ports includes one or more kinds of the following ways:

In Way 1, Time-frequency resource locations of the DMRS ports used for interference measurement and time-frequency resource locations of the DMRS ports used for transmitting the data of the terminal are overlapped, and the terminal performs interference measurement by using DMRS initialization parameters different from and orthogonal masks different from those of the DMRS ports used for transmitting the data of the terminal;

In Way 2, Time-frequency resource locations of the DMRS ports used for interference measurement and time-frequency resource locations of the DMRS ports used for transmitting the data of the terminal are different, and the terminal transmits a non-zero-power signal on the DMRS ports used for interference measurement, the terminal performs interference measurement through the DMRS initialization parameters and orthogonal masks of the DMRS ports used for interference measurement.

Performing interference measurement through the specified REs includes one or more kinds of the following ways:

In Way 1, The specified REs are REs in locations where one or more DMRS ports, except DMRS ports used for transmitting data to the terminal, are located, the network side sends the zero-power signal to the terminal on the REs in locations where the one or more DMRS ports are located, and the terminal performs interference measurement through the received signal on the REs in locations where the DMRS ports are located; and In Way 2, The specified REs are part of REs in locations where the DMRS ports are located, the network side sends the zero-power signal to the terminal on the part of REs in locations where the DMRS ports are located, and the terminal performs interference measurement through the received signal on the part of REs in locations where the DMRS ports are located.

The receiving unit receives a used interference measurement mode indicated by the network side through 1 bit or 2 bits in top layer signaling/physical layer dynamic signaling.

The receiving unit receives a plurality of sets of DMRS initialization parameters configured by the network side for the terminal through the top layer signaling, and receives that the terminal is indicated to use one of the plurality of sets of DMRS initialization parameters for the current interference measurement through the physical layer dynamic signaling;

the receiving unit receives a plurality of sets of DMRS ports configured by the network side for the terminal through the top layer signaling, and receives that the terminal is indicated to use one of the plurality of sets of DMRS ports for the current interference measurement through the physical layer dynamic signaling;

the receiving unit receives a plurality of sets of DMRS ports and DMRS initialization parameters corresponding to the ports configured by the network side for the terminal through the top layer signaling, and receives that the terminal is indicated to use one of the plurality of sets of DMRS ports and DMRS initialization parameters corresponding to the ports for the current interference measurement through the physical layer dynamic signaling;

the receiving unit receives a plurality of sets of DMRS ports and interference measurement modes corresponding to the ports configured by the network side for the terminal through the top layer signaling, and receives that the terminal is indicated to use one of the plurality of sets of DMRS ports and interference measurement modes corresponding to the ports for the current interference measurement through the physical layer dynamic signaling; and the receiving unit receives a plurality of sets of DMRS ports, interference measurement modes corresponding to the ports, and DMRS initialization parameters corresponding to the ports configured by the network side for the terminal through the top layer signaling, and receives that the terminal is indicated to use one of the plurality of sets of DMRS ports, interference measurement modes corresponding to the ports and DMRS initialization parameters corresponding to the ports for the current interference measurement through the physical layer dynamic signaling.

There is a set of parameters in the plurality of sets of parameters sent by the network side and received by the receiving unit which is used for representing using the "power subtraction" interference measurement mode; or besides determining which set of parameters in the plurality of sets of parameters is used for the current interference measurement through a received physical layer dynamic signaling, the interference measurement unit determines whether to use the "power subtraction" interference measurement mode to perform interference measurement through an additional state or signaling.

When the DMRS ports used for interference measurement are determined through the received interference measurement indication information, and when the DMRS ports used for interference measurement and the DMRS ports used for transmitting the data of the terminal are orthogonal on REs in a time-frequency domain, the interference measurement unit extracts data according to rate matching or punching rules of data mapping on REs corresponding to the DMRS ports used for interference measurement.

When the DMRS ports used for interference measurement are determined through the received interference measurement indication information, when REs in a time-frequency domain of the DMRS ports used for interference measurement and REs in a time-frequency domain of the DMRS ports used for transmitting the data of the terminal are overlapped, the interference measurement unit defaults that DMRS initialization parameters corresponding to the DMRS ports used for interference measurement and DMRS initialization parameters corresponding to the DMRS ports used for transmitting the data of the terminal are identical, and performs interference measurement through the orthogonal DMRS ports, and when REs in a time-frequency domain of the DMRS ports used for interference measurement and REs in a time-frequency domain of the DMRS ports used for transmitting the data of the terminal are not overlapped, performs interference measurement by means of averaging interference channel measurement results within physical resource block PRBs.

When the received interference measurement indication information indicates to perform interference measurement through the orthogonal DMRS ports, the interference measurement unit defaults that the DMRS ports used for interference measurement and the DMRS ports used for transmitting the data of the terminal occupy identical time-frequency resource locations, and performs interference measurement based on identical DMRS initializations;

when the received interference measurement indication information indicates to perform interference measurement through the pseudo-orthogonal DMRS ports, the interference measurement unit defaults that the DMRS ports used for interference measurement and the DMRS ports used for transmitting the data of the terminal occupy identical time-frequency resource locations, and performs interference measurement based on different DMRS initialization parameters; and when the received interference measurement indication information indicates to perform interference measurement through the specified REs, the interference measurement unit defaults that locations of REs occupied by the DMRS ports used for interference measurement and locations of REs occupied by the DMRS ports used for transmitting the data of the terminal are different, and defaults that the network side transmits the zero-power signal on DMRS REs used for interference measurement, and extracts data according to rate matching or punching rules of data mapping on the DMRS REs.

The interference measurement unit receives the interference measurement indication information, and performs interference measurement in frequency domain bandwidth resources/physical resource block PRBs in which downlink data transmission corresponding to the terminal is located.

Apparently, the skilled in the art should understand that the modules or steps of the present document mentioned above can be implemented through a universal calculating device, and they can be concentrated on a single calculating device or distributed in a network consisting of a plurality of calculating devices. Alternatively, the modules or steps can be implemented through program codes which can be executed by the calculating device, thus, they can be stored in a storage device to be executed by the calculating device, and in some cases, the illustrated or described steps can be executed in an order different from here, or they can be made into a plurality of integrated circuit modules respectively, or a plurality of modules or steps of them can be made into a single integrated circuit module to be implemented. Therefore, the present invention is not limited to any combination of hardware and software in a specific form.

The above description is only the preferred embodiments of the present document, which is not used to limit the present document. The present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

In the embodiments of the present document, with the assistance of network signaling, the interference measurement effect on data channels and control channels is improved, so as to improve the interference cancellation/interference suppression effect of the receiver, and guarantee the communication quality in the condition of increased network capacity.

What is claimed is:

1. An interference measurement method, comprising:
a network side sending interference measurement indication information to a terminal to indicate the terminal to perform interference measurement, wherein the interference measurement indication information is used for indicating one or more kinds of the following information to the terminal:
interference measurement modes used for performing interference measurement; and
parameter configuration information used for interference measurement,
wherein, the parameter configuration information used for interference measurement comprises one or more kinds of the following information:
DMRS initialization parameters used for interference measurement; and
DMRS ports used for interference measurement,
wherein:
the network side configures a plurality of sets of DMRS initialization parameters for the terminal through the top layer signaling, and indicates the terminal to use one of the plurality of sets of DMRS initialization parameters for the current interference measurement through the physical layer dynamic signaling;
the network side configures a plurality of sets of DMRS ports for the terminal through the top layer signaling, and indicates the terminal to use one of the plurality of sets of DMRS ports for the current interference measurement through the physical layer dynamic signaling;
the network side configures a plurality of sets of DMRS ports and DMRS initialization parameters corresponding to the ports for the terminal through the top layer signaling, and indicates the terminal to use one of the plurality of sets of DMRS ports and DMRS initialization parameters corresponding to the ports for the current interference measurement through the physical layer dynamic signaling;
the network side configures a plurality of sets of DMRS ports and interference measurement modes corresponding to the ports for the terminal through the top layer signaling, and indicates the terminal to use one of the plurality of sets of DMRS ports and interference measurement modes corresponding to the ports for the current interference measurement through the physical layer dynamic signaling; and
the network side configures a plurality of sets of DMRS ports, interference measurement modes corresponding to the ports, and DMRS initialization parameters corresponding to the ports for the terminal through the top layer signaling, and indicates the terminal to use one of the plurality of sets of DMRS ports, interference measurement modes corresponding to the ports, and DMRS initialization parameters corresponding to the ports for the current interference measurement through the physical layer dynamic signaling.

2. The method according to claim 1, wherein, the interference measurement modes comprise one or more kinds of the following modes:
performing interference measurement through orthogonal demodulation reference signal DMRS ports, wherein the mode is to perform interference measurement through DMRS ports orthogonal to DMRS ports used for transmitting data of the terminal;
performing interference measurement through pseudo-orthogonal DMRS ports, wherein the mode is to perform interference measurement through DMRS ports pseudo-orthogonal to DMRS ports used for transmitting data of the terminal;
performing interference measurement through specified resource element REs, wherein the mode is, by transmitting a zero-power signal to the terminal on the specified REs, the terminal performing interference measurement through a received signal on the specified REs; and
"power subtraction" interference measurement, wherein the mode is to perform interference measurement by subtracting useful signals from a total received signal or subtracting received powers of the useful signals from a total received signal power.

3. The method according to claim 1, wherein,
the DMRS initialization parameters used for interference measurement comprise: at least one of a scramble code identity related to a DMRS sequence used for interference measurement, a cell identity related to a DMRS sequence used for interference measurement and a subframe/time slot/physical resource block PRB in which a DMRS used for interference measurement is located; and
the DMRS ports used for interference measurement comprise at least one of DMRS ports 7~14, or comprise at least one of DMRS ports 107~110,
or,
wherein, when the parameter configuration information used for interference measurement simultaneously comprises the DMRS initialization parameters used for interference measurement and the DMRS ports used for interference measurement, the network side configures the DMRS initialization parameters for each DMRS port independently.

4. The method according to claim 2, wherein, performing interference measurement through the DMRS ports orthogonal to the DMRS ports used for transmitting the data of the terminal comprises:
the DMRS ports used for interference measurement and the DMRS ports used for transmitting the data of the terminal satisfying an orthogonal relationship, and the terminal having known related parameter information of interference signal transmission on the DMRS ports used for interference measurement,
or,
wherein, performing interference measurement through the DMRS ports pseudo-orthogonal to the DMRS ports used for transmitting the data of the terminal comprises:
the DMRS ports used for interference measurement and the DMRS ports used for transmitting the data of the terminal satisfying a pseudo-orthogonal relationship, and the terminal having known related parameter information of interference signal transmission on the DMRS ports used for interference measurement,
or,
wherein, performing interference measurement through the specified REs comprises one or more kinds of the following modes:
the specified REs are REs in locations where one or more DMRS ports, except DMRS ports used for transmitting data to the terminal, are located, the network side sends the zero-power signal to the terminal on the REs in locations where the one or more DMRS ports are located, and the terminal performs interference measurement through the received signal on the REs in locations where the DMRS ports are located; and
the specified REs are part of REs in locations where the DMRS ports are located, the network side sends the zero-power signal to the terminal on the part of REs in locations where the DMRS ports are located, and the terminal performs interference measurement through the received signal on the part of REs in locations where the DMRS ports are located.

5. An interference measurement method, comprising:
a terminal receiving interference measurement indication information sent by a network side, and performing interference measurement according to an indication of the interference measurement indication information, wherein the interference measurement indication information is used for indicating one or more kinds of the following information:
interference measurement modes used for performing interference measurement; and
parameter configuration information used for interference measurement,
wherein, the parameter configuration information used for interference measurement comprises one or more kinds of the following information:
DMRS initialization parameters used for interference measurement; and
DMRS ports used for interference measurement,
wherein:
the terminal determines a plurality of sets of DMRS initialization parameters by receiving the top layer signal from the network side, and determines one of the plurality of sets of DMRS initialization parameters used for the current interference measurement by receiving physical layer dynamic signaling;
the terminal determines a plurality of sets of DMRS ports by receiving the top layer signal from the network side, and determines one of the plurality of sets of DMRS ports used for the current interference measurement by receiving physical layer dynamic signaling;
the terminal determines a plurality of sets of DMRS ports and DMRS initialization parameters corresponding to the ports by receiving the top layer signal from the network side, and determines one of the plurality of sets of DMRS ports and DMRS initialization parameters corresponding to the ports used for the current interference measurement by receiving physical layer dynamic signaling;
the terminal determines a plurality of sets of DMRS ports and interference measurement modes corresponding to the ports by receiving the top layer signal from the network side, and determines one of the plurality of sets of DMRS ports and interference measurement modes corresponding to the ports used for the current interference measurement by receiving physical layer dynamic signaling; and
the terminal determines a plurality of sets of DMRS ports, interference measurement modes corresponding to the ports, and DMRS initialization parameters corresponding to the ports by receiving the top layer signal from the network side, and determines one of the plurality of sets of DMRS ports, interference measurement modes corresponding to the ports, and DMRS initialization parameters corresponding to the ports used for the current interference measurement by receiving physical layer dynamic signaling.

6. The method according to claim 5, wherein, the interference measurement modes comprise one or more kinds of the following modes:
performing interference measurement through orthogonal demodulation reference signal DMRS ports, wherein the mode is to perform interference measurement through DMRS ports orthogonal to DMRS ports used for transmitting data of the terminal;
performing interference measurement through pseudo-orthogonal DMRS ports, wherein the mode is to perform interference measurement through DMRS ports pseudo-orthogonal to DMRS ports used for transmitting data of the terminal;
performing interference measurement through specified resource element REs, wherein the mode is, by transmitting a zero-power signal to the terminal on the specified REs, the terminal performing interference measurement through a received signal on the specified REs; and "power subtraction" interference measurement, wherein the mode is to perform interference measurement by subtracting useful signals from a total received signal or subtracting received powers of the useful signals from a total received signal power.

7. The method according to claim 6, wherein, performing interference measurement through the DMRS ports orthogonal to the DMRS ports used for transmitting the data of the terminal comprises:

the DMRS ports used for interference measurement and the DMRS ports used for transmitting the data of the terminal satisfying an orthogonal relationship, and the terminal having known related parameter information of interference signal transmission on the DMRS ports used for interference measurement, or, wherein, performing interference measurement through the DMRS ports pseudo-orthogonal to the DMRS ports used for transmitting the data of the terminal comprises:

the DMRS ports used for interference measurement and the DMRS ports used for transmitting the data of the terminal satisfying a pseudo-orthogonal relationship, and the terminal having known related parameter information of interference signal transmission on the DMRS ports used for interference measurement, or, wherein, performing interference measurement through the specified REs comprises one or more kinds of the following modes:

the specified REs are REs in locations where one or more DMRS ports, except DMRS ports used for transmitting data to the terminal, are located, the network side sends the zero-power signal to the terminal on the REs in locations where the one or more DMRS ports are located, and the terminal performs interference measurement through the received signal on the REs in locations where the DMRS ports are located; and the specified REs are part of REs in locations where the DMRS ports are located, the network side sends the zero-power signal to the terminal on the part of REs in locations where the DMRS ports are located, and the terminal performs interference measurement through the received signal on the part of REs in locations where the DMRS ports are located.

8. The method according to claim 5, further comprising:

when the terminal determines the DMRS ports used for interference measurement through the received interference measurement indication information, and when the DMRS ports used for interference measurement and the DMRS ports used for transmitting the data of the terminal are orthogonal on REs in a time-frequency domain, the terminal extracting data according to rate matching or punching rules of data mapping on REs corresponding to the DMRS ports used for interference measurement, or, the method further comprises: when the terminal determines the DMRS ports used for interference measurement through the received interference measurement indication information, when REs in a time-frequency domain of the DMRS ports used for interference measurement and REs in a time-frequency domain of the DMRS ports used for transmitting the data of the terminal are overlapped, the terminal defaulting that DMRS initialization parameters corresponding to the DMRS ports used for interference measurement and DMRS initialization parameters corresponding to the DMRS ports used for transmitting the data of the terminal are identical, and performing interference measurement through the orthogonal DMRS ports, and when REs in a time-frequency domain of the DMRS ports used for interference measurement and REs in a time-frequency domain of the DMRS ports used for transmitting the data of the terminal are not overlapped, the terminal performing interference measurement by means of averaging interference channel measurement results within physical resource block PRBs, or, the method further comprises: when the interference measurement indication information received by the terminal indicates to perform interference measurement through the orthogonal DMRS ports, the terminal defaulting that the DMRS ports used for interference measurement and the DMRS ports used for transmitting the data of the terminal occupy identical time-frequency resource locations, and performing interference measurement based on identical DMRS initializations;

when the interference measurement indication information received by the terminal indicates to perform interference measurement through the pseudo-orthogonal DMRS ports, the terminal defaulting that the DMRS ports used for interference measurement and the DMRS ports used for transmitting the data of the terminal occupy identical time-frequency resource locations, and performing interference measurement based on different DMRS initialization parameters; and when the interference measurement indication information received by the terminal indicates to perform interference measurement through the specified REs, the terminal defaulting that locations of REs occupied by the DMRS ports used for interference measurement and locations of REs occupied by the DMRS ports used for transmitting the data of the terminal are different, and the terminal defaulting that the network side transmits the zero-power signal on DMRS REs used for interference measurement, and extracting data according to rate matching or punching rules of data mapping on the DMRS REs, or, wherein, the DMRS initialization parameters used for interference measurement comprise: at least one of a scramble code identity related to a DMRS sequence used for interference measurement, a cell identity related to a DMRS sequence used for interference measurement and a subframe/time slot/physical resource block PRB in which a DMRS used for interference measurement is located; and the DMRS ports used for interference measurement comprise at least one of DMRS ports 7~14, or comprise at least one of DMRS ports 107~110.

9. The method according to claim 5, further comprising:

the terminal receiving the interference measurement indication information, and performing interference measurement in frequency domain bandwidth resources/physical resource block PRBs in which downlink data transmission corresponding to the terminal is located.

10. A network side device, comprising a processor and a storage device, wherein the storage device stores processor-executable programs, and the programs comprise: an information generation unit and an information sending unit, wherein:
    the information generation unit is configured to generate interference estimation indication information;
    the information sending unit is configured to send interference measurement indication information to a terminal to indicate the terminal to perform interference measurement;
    wherein, the interference measurement indication information is used for indicating one or more kinds of the following information to the terminal:
    interference measurement modes used for performing interference measurement; and
    parameter configuration information used for interference measurement,
    wherein, the parameter configuration information used for interference measurement comprises one or more kinds of the following information:
    DMRS initialization parameters used for interference measurement; and
    DMRS ports used for interference measurement, wherein:
    the information sending unit is configured to configure a plurality of sets of DMRS initialization parameters for the terminal through the top layer signaling, and indicate the terminal to use one of the plurality of sets of DMRS initialization parameters for the current interference measurement through the physical layer dynamic signaling;
    the information sending unit is configured to configure a plurality of sets of DMRS ports for the terminal through the top layer signaling, and indicate the terminal to use one of the plurality of sets of DMRS ports for the current interference measurement through the physical layer dynamic signaling;
    the information sending unit is configured to configure a plurality of sets of DMRS ports and DMRS initialization parameters corresponding to the ports for the terminal through the top layer signaling, and indicate the terminal to use one of the plurality of sets of DMRS ports and DMRS initialization parameters corresponding to the ports for the current interference measurement through the physical layer dynamic signaling;
    the information sending unit is configured to configure a plurality of sets of DMRS ports and interference measurement modes corresponding to the ports for the terminal through the top layer signaling, and indicate the terminal to use one of the plurality of sets of DMRS ports and interference measurement modes corresponding to the ports for the current interference measurement through the physical layer dynamic signaling; and
    the information sending unit is configured to configure a plurality of sets of DMRS ports, interference measurement modes corresponding to the ports, and DMRS initialization parameters corresponding to the ports for the terminal through the top layer signaling, and indicate the terminal to use one of the plurality of sets of DMRS ports, interference measurement modes corresponding to the ports, and DMRS initialization parameters corresponding to the ports for the current interference measurement through the physical layer dynamic signaling.

11. The network side device according to claim 10, wherein, the interference measurement modes comprise one or more kinds of the following modes:
    performing interference measurement through orthogonal demodulation reference signal DMRS ports, wherein the mode is to perform interference measurement through DMRS ports orthogonal to DMRS ports used for transmitting data of the terminal;
    performing interference measurement through pseudo-orthogonal DMRS ports, wherein the mode is to perform interference measurement through DMRS ports pseudo-orthogonal to DMRS ports used for transmitting data of the terminal;
    performing interference measurement through specified resource element REs, wherein the mode is, by transmitting a zero-power signal to the terminal on the specified REs, the terminal performing interference measurement through a received signal on the specified REs; and
    "power subtraction" interference measurement, wherein the mode is to perform interference measurement by subtracting useful signals from a total received signal or subtracting received powers of the useful signals from a total received signal power.

12. The network side device according to claim 10, wherein:
    the DMRS initialization parameters used for interference measurement comprise: at least one of a scramble code identity related to a DMRS sequence used for interference measurement, a cell identity related to a DMRS sequence used for interference measurement and a subframe/time slot/physical resource block PRB in which a DMRS used for interference measurement is located; and
    the DMRS ports used for interference measurement comprise at least one of DMRS ports 7~14, or comprise at least one of DMRS ports 107~110.

13. The network side device according to claim 11, wherein, performing interference measurement through the DMRS ports orthogonal to the DMRS ports used for transmitting the data of the terminal comprises:
    the DMRS ports used for interference measurement and the DMRS ports used for transmitting the data of the terminal satisfying an orthogonal relationship, and the terminal having known related parameter information of interference signal transmission on the DMRS ports used for interference measurement,
    or,
    wherein, performing interference measurement through the DMRS ports pseudo-orthogonal to the DMRS ports used for transmitting the data of the terminal comprises:
    the DMRS ports used for interference measurement and the DMRS ports used for transmitting the data of the terminal satisfying a pseudo-orthogonal relationship, and the terminal having known related parameter information of interference signal transmission on the DMRS ports used for interference measurement,
    or,
    wherein, performing interference measurement through the specified REs comprises one or more kinds of the following modes:
    the specified REs are REs in locations where one or more DMRS ports, except DMRS ports used for transmitting data to the terminal, are located, the network side sends the zero-power signal to the terminal on the REs in locations where the one or more DMRS ports are located, and the terminal performs interference measurement through the received signal on the REs in locations where the DMRS ports are located; and the specified REs are part of REs in locations where the DMRS ports are located, the network side sends the zero-power signal to the terminal on the part of REs in locations where the DMRS ports are located, and the terminal performs interference measurement through the received signal on the part of REs in locations where the DMRS ports are located.

14. A terminal device, comprising a processor and a storage device, wherein the storage device stores processor-executable programs, and the programs comprise: a receiving unit and an interference measurement unit, wherein:

the receiving unit is configured to receive interference measurement indication information sent by a network side;

the interference measurement unit is configured to perform interference measurement according to an indication of the interference measurement indication information;

wherein, the interference measurement indication information is used for indicating one or more kinds of the following information:

interference measurement modes used for performing interference measurement; and parameter configuration information used for interference measurement, wherein, the parameter configuration information used for interference measurement comprises one or more kinds of the following information:

DMRS initialization parameters used for interference measurement; and

DMRS ports used for interference measurement, wherein:

the receiving unit is configured to determine a plurality of sets of DMRS initialization parameters by receiving the top layer signal from the network side, and determine one of the plurality of sets of DMRS initialization parameters used for the current interference measurement by receiving physical layer dynamic signaling;

the receiving unit is configured to determine a plurality of sets of DMRS ports by receiving the top layer signal from the network side, and determine one of the plurality of sets of DMRS ports used for the current interference measurement by receiving physical layer dynamic signaling;

the receiving unit is configured to determine a plurality of sets of DMRS ports and DMRS initialization parameters corresponding to the ports by receiving the top layer signal from the network side, and determine one of the plurality of sets of DMRS ports and DMRS initialization parameters corresponding to the ports used for the current interference measurement by receiving physical layer dynamic signaling;

the receiving unit is configured to determine a plurality of sets of DMRS ports and interference measurement modes corresponding to the ports by receiving the top layer signal from the network side, and determine one of the plurality of sets of DMRS ports and interference measurement modes corresponding to the ports used for the current interference measurement by receiving physical layer dynamic signaling; and the receiving unit is configured to determine a plurality of sets of DMRS ports, interference measurement modes corresponding to the ports, and DMRS initialization parameters corresponding to the ports by receiving the top layer signal from the network side, and determine one of the plurality of sets of DMRS ports, interference measurement modes corresponding to the ports, and DMRS initialization parameters corresponding to the ports used for the current interference measurement by receiving physical layer dynamic signaling.

15. The terminal device according to claim 14, wherein, the interference measurement modes comprise one or more kinds of the following modes:

performing interference measurement through orthogonal demodulation reference signal DMRS ports, wherein the mode is to perform interference measurement through DMRS ports orthogonal to DMRS ports used for transmitting data of the terminal;

performing interference measurement through pseudo-orthogonal DMRS ports, wherein the mode is to perform interference measurement through DMRS ports pseudo-orthogonal to DMRS ports used for transmitting data of the terminal;

performing interference measurement through specified resource element REs, wherein the mode is, by transmitting a zero-power signal to the terminal on the specified REs, the terminal performing interference measurement through a received signal on the specified REs; and "power subtraction" interference measurement, wherein the mode is to perform interference measurement by subtracting useful signals from a total received signal or subtracting received powers of the useful signals from a total received signal power.

16. The terminal device according to claim 15, wherein, performing interference measurement through the DMRS ports orthogonal to the DMRS ports used for transmitting the data of the terminal comprises:

the DMRS ports used for interference measurement and the DMRS ports used for transmitting the data of the terminal satisfying an orthogonal relationship, and the terminal having known related parameter information of interference signal transmission on the DMRS ports used for interference measurement, or, wherein, performing interference measurement through the DMRS ports pseudo-orthogonal to the DMRS ports used for transmitting the data of the terminal comprises:

the DMRS ports used for interference measurement and the DMRS ports used for transmitting the data of the terminal satisfying a pseudo-orthogonal relationship, and the terminal having known related parameter information of interference signal transmission on the DMRS ports used for interference measurement, or, wherein, performing interference measurement through the specified REs comprises one or more kinds of the following modes:

the specified REs are REs in locations where one or more DMRS ports, except DMRS ports used for transmitting data to the terminal, are located, the network side sends the zero-power signal to the terminal on the REs in locations where the one or more DMRS ports are located, and the terminal performs interference measurement through the received signal on the REs in locations where the DMRS ports are located; and the specified REs are part of REs in locations where the DMRS ports are located, the network side sends the zero-power signal to the terminal on the part of REs in locations where the DMRS ports are located, and the terminal performs interference measurement through the received signal on the part of REs in locations where the DMRS ports are located.

17. The terminal device according to claim 14, wherein:

the interference measurement unit is further configured to: when the DMRS ports used for interference measurement are determined through the received interference measurement indication information, and when the DMRS ports used for interference measurement and the DMRS ports used for transmitting the data of the terminal are orthogonal on REs in a time-frequency domain, extract data according to rate matching or punching rules of data mapping on REs corresponding to the DMRS ports used for interference measurement, or, wherein:

the interference measurement unit is further configured to: when the DMRS ports used for interference measurement are determined through the received interference measurement indication information, when REs in a time-frequency domain of the DMRS ports used for interference measurement and REs in a time-frequency domain of the DMRS ports used for transmitting the data of the terminal are overlapped, default that DMRS initialization parameters corresponding to the DMRS ports used for interference measurement and DMRS initialization parameters corresponding to the DMRS ports used for transmitting the data of the terminal are identical, and perform interference measurement through the orthogonal DMRS ports, and when REs in a time-frequency domain of the DMRS ports used for interference measurement and REs in a time-frequency domain of the DMRS ports used for transmitting the data of the terminal are not overlapped, perform interference measurement by means of averaging interference channel measurement results within physical resource block PRBs, or, wherein:

the interference measurement unit is further configured to: when the received interference measurement indication information indicates to perform interference measurement through the orthogonal DMRS ports, default that the DMRS ports used for interference measurement and the DMRS ports used for transmitting the data of the terminal occupy identical time-frequency resource locations, and perform interference measurement based on identical DMRS initializations;

the interference measurement unit is further configured to: when the received interference measurement indication information indicates to perform interference measurement through the pseudo-orthogonal DMRS ports, default that the DMRS ports used for interference measurement and the DMRS ports used for transmitting the data of the terminal occupy identical time-frequency resource locations, and perform interference measurement based on different DMRS initialization parameters; and the interference measurement unit is further configured to: when the received interference measurement indication information indicates to perform interference measurement through the specified REs, default that locations of REs occupied by the DMRS ports used for interference measurement and locations of REs occupied by the DMRS ports used for transmitting the data of the terminal are different, and default that the network side transmits the zero-power signal on DMRS REs used for interference measurement, and extract data according to rate matching or punching rules of data mapping on the DMRS REs, or, wherein, the DMRS initialization parameters used for interference measurement comprise: at least one of a scramble code identity related to a DMRS sequence used for interference measurement, a cell identity related to a DMRS sequence used for interference measurement and a subframe/time slot/physical resource block PRB in which a DMRS used for interference measurement is located; and the DMRS ports used for interference measurement comprise at least one of DMRS ports 7~14, or comprise at least one of DMRS ports 107~110.

18. The terminal device according to claim 14, wherein:

the interference measurement unit is further configured to receive the interference measurement indication information, and perform interference measurement in frequency domain bandwidth resources/physical resource block PRBs in which downlink data transmission corresponding to the terminal is located.

* * * * *